(12) United States Patent
Rehm

(10) Patent No.: US 6,802,041 B1
(45) Date of Patent: Oct. 5, 2004

(54) MULTIMEDIA WORD PROCESSOR

(75) Inventor: Peter H Rehm, Orem, UT (US)

(73) Assignee: PerfectNotes Corporation, Orem, UT (US)

( * ) Notice: Subject to any disclaimer, the term of this patent is extended or adjusted under 35 U.S.C. 154(b) by 0 days.

(21) Appl. No.: 09/488,424

(22) Filed: Jan. 20, 2000

Related U.S. Application Data

(60) Provisional application No. 60/116,528, filed on Jan. 20, 1999.

(51) Int. Cl.[7] .......................... G06F 15/00; G06F 12/00
(52) U.S. Cl. .................... 715/500.1; 715/500; 715/512; 345/728; 345/731
(58) Field of Search .............................. 715/500.1, 512, 715/500; 709/216, 328, 217; 725/87; 345/723, 731, 728

(56) References Cited

U.S. PATENT DOCUMENTS

| 4,425,586 | A | | 1/1984 | Miller |
| 4,841,387 | A | | 6/1989 | Rindfuss |
| 4,924,387 | A | | 5/1990 | Jeppesen |
| 5,272,571 | A | | 12/1993 | Henderson |
| 5,442,390 | A | * | 8/1995 | Hooper et al. ................ 725/90 |
| 5,535,063 | A | | 7/1996 | Lamming |
| 5,546,565 | A | | 8/1996 | Suzuki |
| 5,550,966 | A | | 8/1996 | Drake |
| 5,564,005 | A | | 10/1996 | Weber |
| 5,572,728 | A | | 11/1996 | Tada |
| 5,675,511 | A | * | 10/1997 | Prasad et al. ............ 715/500.1 |
| 5,794,249 | A | | 8/1998 | Orsolini |
| 5,818,436 | A | | 10/1998 | Imai |
| 5,826,102 | A | * | 10/1998 | Escobar et al. .......... 715/500.1 |
| 5,970,455 | A | | 10/1999 | Wilcox |
| 5,986,655 | A | | 11/1999 | Chiu |
| 5,995,936 | A | | 11/1999 | Brais |
| 6,219,837 | B1 | * | 4/2001 | Yeo et al. ..................... 725/38 |
| 6,239,793 | B1 | * | 5/2001 | Barnert et al. ........... 715/500.1 |
| 6,546,405 | B2 | * | 4/2003 | Gupta et al. ............... 715/512 |
| 6,549,922 | B1 | * | 4/2003 | Srivastava et al. .......... 707/205 |

FOREIGN PATENT DOCUMENTS

| EP | 0 495 612 A2 | 7/1992 |
| EP | 0 780 777 A1 | 6/1997 |

OTHER PUBLICATIONS

L Stifelman, "Augmenting Real–World Objects—A Paper–Based Audio Notebook," CHI 96, Apr. 13–18, p. 199.

* cited by examiner

*Primary Examiner*—Stephen S. Hong
*Assistant Examiner*—Matthew Ludwig
(74) *Attorney, Agent, or Firm*—Peter H. Rehm

(57) ABSTRACT

A word processor optimized for students taking notes automatically opens the correct document for each course according to a class schedule. It makes digital audio or video recordings of classes and establishes various kinds of links between the notes being taken and the point in the recording at the time the notes were taken. A special microphone is optimized for distance and reduced interference. After permitting the word processor to break the silence, any incomplete notes can be completed by using the links to quickly find the portion of the recording relevant to the incomplete notes. The search is improved by providing configurable preplay times based on the type of link and by playing back the recording at increased speed with pitch correction. Transcription of part of the recording is facilitated by playing this part in a series of short overlapping segments and transcribing each segment before playing the next.

16 Claims, 21 Drawing Sheets

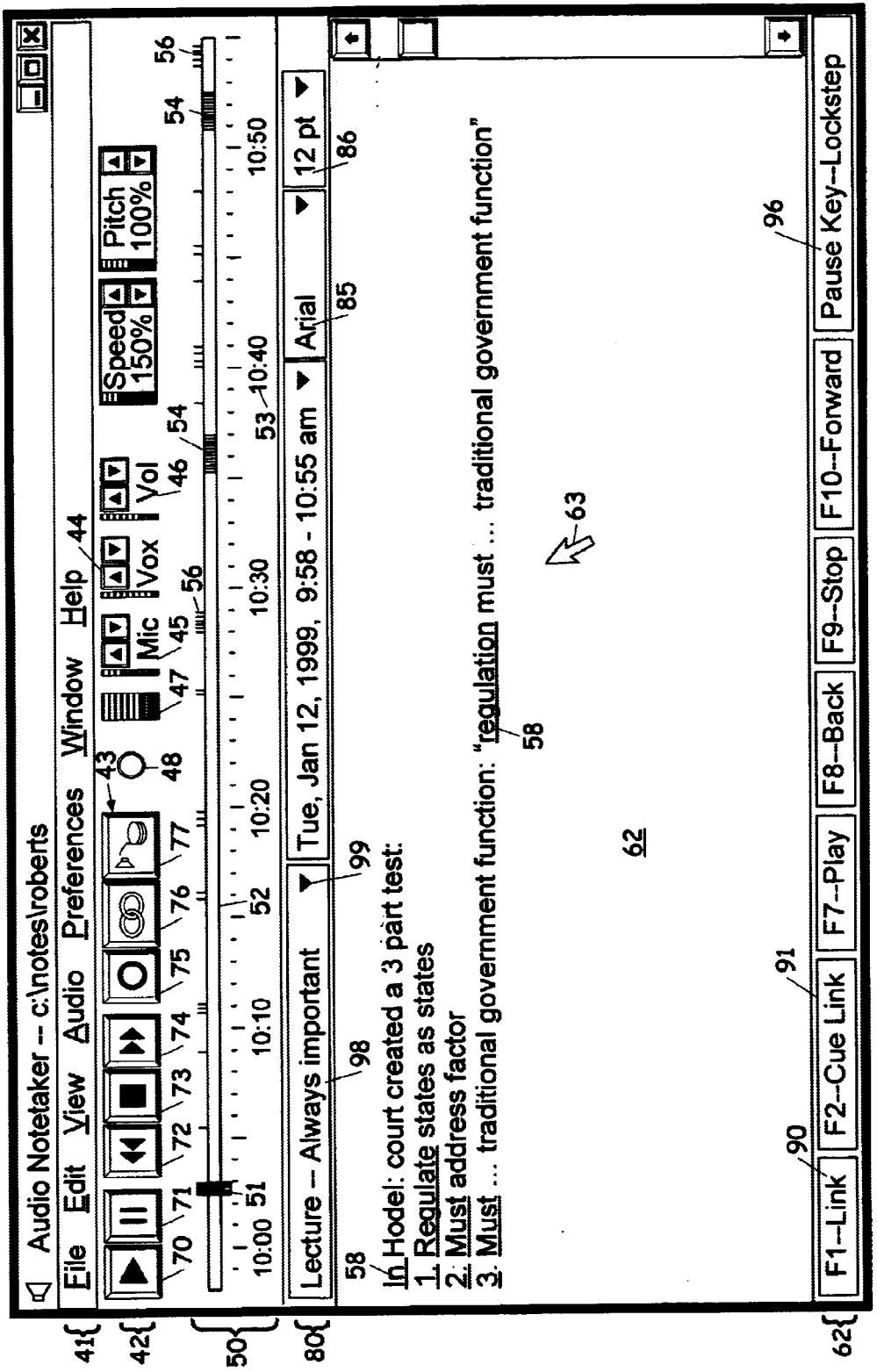

Fig. 5A

[W0=C:\phr\notes\conlaw.wav][Ai0@40000]Hodel: court created a 3 part test:
[Ai0@61000]1. [Ai0@62000]Regulate states as states [Ai0@78000]2.
[Ai0@79000]Must address factor
[Ai0@120000]3. [Ai0@121000]Must .. traditional government function: "[Ai0@183000]regulation must ... traditional government function: [Ai0@188000]

Fig. 5B

<a href="C:\phr\notes\conlaw.wav#40000">In</a> Hodel: court created a 3 part test:
<a href="C:\phr\notes\conlaw.wav#61000">1.</a>
<a href="C:\phr\notes\conlaw.wav#62000">Regulate</a> states as states
<a href="C:\phr\notes\conlaw.wav#78000">2.</a>
<a href="C:\phr\notes\conlaw.wav#79000">Must</a> address factor
<a href="C:\phr\notes\conlaw.wav#120000">3.</a>
<a href="C:\phr\notes\conlaw.wav#121000">Must</a> ... traditional government function:
"<a href="C:\phr\notes\conlaw.wav#183000">regulation</a> must ... traditional government function"<a href="C:\phr\notes\conlaw.wav#188000"></a>

MULTIMEDIA WORD PROCESSOR

This application claims the benefit of Provisional Patent Application Ser. No. 60/116,528, filed Jan. 20, 1999, which is hereby incorporated by reference.

BACKGROUND OF THE INVENTION

Students, journalists, secretaries and others often attend lectures, meetings and other events and need to remember the information presented. Usually they take notes by hand. They may use these notes as they are, or enter them into a word processor later. Unfortunately, because a speaker, teacher or lecturer can present information much faster than it can be written, notes taken during a lecture or meeting are typically incomplete and often contain inaccuracies.

Another disadvantage of taking notes is that it conflicts with full participation and interaction with other people present. It can be difficult to make comments and ask or answer questions while taking notes.

Also, the information that is presented is better received when the listener gives undivided thought. The need to take notes competes with concentration on the material itself. When the material is complex, taking notes can interfere with the depth of concentration required to comprehend what is being presented. The material will then have to be learned later, often from the incomplete or inaccurate notes.

In an attempt to overcome these problems, some people make an audio recording for later reference. An audio recording can solve the problems of omissions and inaccuracies. But an audio recording is accessed sequentially. It is most suited for listening to the entire event or a large portion of it a second time. The recording can not provide a summary of the event, and it is difficult to pick out its most important parts. It can not be reviewed as quickly and readily as some notes on a few sheets of paper can be reviewed. If there is a question about the accuracy of a particular point in the notes, or an omission in the notes, it is difficult to verify or fill in the omission without a time-consuming search of the recording. Correcting several such questions or omissions easily takes as long as a second listening of the entire recording. Thus, the recording introduces new problems of accessing the recorded material in a reasonable time.

Another way some people try to take better notes is to use a personal portable computer in the field. The person can enter notes directly into a portable computer as an event occurs. The computer software used for this purpose may be a word processor, text editor, memo field or the like. For users who can type fast enough, this can be an improvement over handwritten notes. The new notes can be added to a file in the computer that containing all the notes of a similar topic, such as previous class meetings of a college course. Using a computer, it is easy to make the notes more coherent and presentable. Thus, using a computer in this manner can be beneficial.

However, using a portable computer to take notes of an event as it occurs does not eliminate the problem of omissions and inaccuracies in the notes. For instance, although experienced typists can type text faster than it can be written in longhand, they can not type exact quotations spoken at normal speed. Taking notes becomes even harder when the subject matter is unfamiliar, complex or spoken quickly. Important information or exact wording can be lost or mistranscribed. Further, under most circumstances it is difficult to operate the computer keyboard under such intense circumstances and at the same time pay attention to, respond to, or otherwise interact with the speaker. Additionally, intense keyboard clatter can annoy other people who are present.

Most portable computers have multimedia hardware that enables them to make and play back an audio recording. Such portable multimedia computers can record events lasting from minutes to many hours, depending on the amount of computer storage available (typically a hard disk drive or RAM). Software to help in this task is available. Typically, such software is modeled after a tape recorder paradigm. It presents buttons to the user such as "Play," "Stop," "Pause," "Fast Forward," "Rewind," and "Record." Some additionally have a slider for immediate access to any part of the recording without the need to fast forward or rewind. The slider is moved using a pointing device such as a mouse, track ball or track pad, touch screen, or by keystrokes.

However, regardless of whether a tape recorder or the computer itself is used to record the audio event, there remains the problem of having to later locate on the tape, or the computer's recording (typically a file on the computer hard disk), the pertinent recorded portions. As is well known, such a process is usually done by trial and error: Usually the user fast forwards and rewinds the recording until the needed portion is located. On some multimedia computers, the search may be done by using a pointing device (such as a mouse) to move a slider control back and forth until the desired part is found.

One of the difficulties of a trial and error search is that upon hearing a portion of the recording, it is often difficult to determine whether it is before or after the desired portion, and by how much. Thus, it is necessary to listen to each portion long enough to determine the subject matter at that point and to remember or guess where the portion fits in relative to the desired portion. This is difficult to do when the lecture or other audio event is unfamiliar, which is usually the case. The whole process discourages people from recording something unless they esteem it important enough to invest considerable time into listening to all of it or at least much of it again. Often recordings made with good intentions are never listened to at all.

Sometimes an exact transcript of an event is important enough to hire a stenographer to create it. U.S. Pat. No. 5,272,571 to Henderson et al discloses a stenotype machine and computer system for use by people skilled in stenotype, such as court reporters. A stenotype operator transcribes spoken words into their phonetic representations by entering phonetic keystrokes on a stenotype machine. According to Henderson, as the stenotype operator does this, the stenotype machine makes a digital audio recording and establishes links (pointers) between the phonetic keystrokes and the digital audio recording. Later, these data are transferred to a computer. The computer attempts to look up the phonetic keystrokes in dictionaries of such keystrokes to transcribe the phonetic keystrokes into text. Phonetic keystrokes that are not found in the dictionary are known as "untranslates." The court reporter can resolve the untranslates and anything else that might be mistranslated by directing the computer to play back the relevant audio portion. The computer finds the link between the untranslated (or any phonetic keystroke) and the audio recording. It uses this link as a pointer into the audio recording to play back the particular audio recorded proximate to those phonetic keystrokes.

While this stenotype system may be useful for its intended purpose, where phonetic keystrokes are entered in step with each syllable spoken, it does not meet the needs of students and others who merely want to take notes on a word processor. One reason is that most people have not acquired the skill of operating a stenotype machine. Operating a stenotype machine requires extensive training and enough skill to keep pace with the speaker. On the other hand, virtually everyone can operate an ordinary typewriter or computer keyboard at some speed, fast or slow, even without training.

Another reason a stenotype system does not meet the needs of people who want to take notes is that they usually do not need an entire transcript. The person taking notes on paper or into a word processor is free to summarize, insert personal comments or otherwise change the information presented. Taking notes into a word processor is usually at least partially a creative endeavor. Nevertheless, the information often comes too fast to handle in such a creative endeavor and important facts are missed. Even when there is adequate time to enter the notes, the notes are not entered in sync with a speaker.

Therefore, there is need for something that helps a person who take notes, possibly including personal comments, sketches, exact quotations or even an entire transcript, to fix these notes in some tangible form with reduced risk of inaccuracies or loss, regardless of the disparity between the pace of a presentation and the person's ability to write or type, and to access and use this information in a convenient manner. The present invention addresses this need.

OBJECTS AND SUMMARY OF THE INVENTION

1. Objects

It is an object of the invention to provide a method of using a computer with multimedia capability to improve the note-taking capabilities of individuals who want to take accurate notes. It is also an object of the invention to provide a way for users to take notes that include exact quotations, ranging from an occasional quote up to an entire transcript, as they wish, that the users could not otherwise accurately and conveniently include in their notes. It is a further object of the invention to greatly reduce or often eliminate the need to search by trial and error for a particular portion of an audio recording.

It is a further object of the invention to allow users to conveniently augment their notes after an audio event, such that whenever they suspect they may have missed something in their notes, they can quickly and conveniently review exactly what was said or shown and supplement their notes as desired.

It is a further object of the invention to free users of the invention to more fully participate at lectures, meetings, and other circumstances by greatly reducing the effort needed to take notes during these events. Another object is to enable people who use notebook computers to take notes to reduce the amount of keyboard noise they create without reducing the quality of their notes.

A further object of the invention is to provide a method of programming a computer that allows a user to utilize the audio recording capabilities of computer hardware in conjunction with the textual input capabilities of a computer word processor in an integrated and seamless fashion.

A still further object of the invention is to provide a way to access particular points in an audio recording by reference to various portions of text in a word processor that reveal the significance of each point in the audio recording.

It is also an object of the invention to provide the above objects in highly portable computing devices, including, without limitation, notebook computers, subnotebook computers, palm computers, personal digitalal assitants, and so on.

2. Summary

The foregoing and other objects are achieved with a novel method of controlling the multimedia capabilities of a computer and a word processor or similar text processing application, and integrating the word processor and multimedia capabilities of the computer. The invention enables users to utilize a new kind of word processor to enter notes while listening to a lecture, conversation, presentation or similar event and simultaneously use the computer's multimedia capability to make an audio recording of the event. The invention also includes video recording for computers that can provide this function.

The word processing and multimedia functions are integrated in that as the user enters text into the word processor, the portion of the text being entered is linked to the audio portion that is being recorded. This is done by semi-automatically and/or automatically establishing "audio links" (or just "links") that associate particular points in the text with particular points in the audio recording. When an audio event is over, the text contains notes of the important parts of the event, complete or incomplete. These notes are linked directly to the corresponding portions of the audio recording. The method also accommodates the entry of text and establishment of audio links while playing a recording of a previously-recorded audio event.

The word processing and audio functions are further integrated for playback of the audio recording. The user can use the keyboard or a pointing device to control the playback of the audio recording. This is done by selecting a portion of the text and telling the computer to play back the portion of the audio recording that is linked to the selected text. The audio portion played back is the audio portion that was recorded when the selected text was originally entered during the audio event. The user can play-back the entire audio event or any portion of it, depending on how much text is selected. The user can choose to never play back portions of the audio recording linked to notes that are satisfactorily complete and play back only those portions that are linked to notes that are incomplete or suspect. The user does not have to "scan" the recording or search it by trial and error in order to locate the desired audio portion(s). The user need only select that portion of the text that corresponds to the desired audio portion.

The invention also supports the display of audio links within the text in several ways. The user can point to such a display with a pointing device such as a mouse and click on the display. The invention will then look up the audio link and start playing the audio starting from the moment recorded when the audio link was first created. Some preferred ways an audio link can be displayed include, without limitation, highlighting a word in the text so it looks like a HTML-style hyperlink (such as in a different color and/or underlined), displaying a special symbol that is inserted in the text, displaying special indicia along the left or right margin of the text, and displaying the time of day the link was created in the left or right margin of the text.

Another feature of the invention is to allow replay of the audio a segment at a time, either for predetermined segment lengths or for as long as a button is held down. The invention provides that the user can specify an overlap time, so that, for example, a spoken word that is cut off at the end of one segment will be fully played at the beginning of the next segment.

The invention also provides optional features that allow the user to adjust playback speed and/or pitch, and to protect against the invention suddenly playing audio aloud at an inappropriate time, such as during or just after recording an event.

The invention also provides for outputting the text and multimedia data it generates to both standard HTML and an enhanced form of HTML that can specify playing an audio file starting at any arbitrary point.

An optional feature of the invention provides the user with the ability to selectively delete portions of an audio record by indicating on the text which portions of the audio recording are to be deleted, and thereby free up audio storage space.

Another optional feature of the invention for minimizing the use of audio storage space, when activated by the user, causes the computer to detect when a portion of an event is of no interest to the user and to discard that portion of the audio recording, and when a following portion of the event becomes of interest to the user to retain a portion of the recording for a predetermined amount of time just prior to when the user decided the following portion was of interest, as determined by express command or automatically by keyboard activity.

Another feature of the invention is that the recording and playback of the audio event is controlled according to a set of "user preferences." The user preferences determine when to establish audio links, how to compensate for delays, how replay is controlled, which features are in effect at any time, and other matters. Different sets of user preferences are conveniently available for different users and to adapt the invention to different types of audio events.

BRIEF DESCRIPTION OF THE DRAWINGS

FIG. 4 shows the main window of the invention as displayed on a computer monitor.

FIGS. 5A and 5B show examples of the same word processor file, each including a different example structure of the same example text and audio links.

DETAILED DESCRIPTION OF THE PREFERRED EMBODIMENT

Section headings are for convenience only. The material given under a section heading is not necessarily the only material on the topic, nor is it necessarily limited to the topic.

Figure 1A:
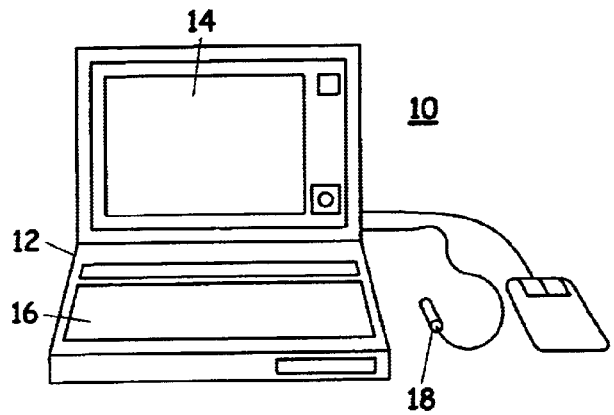
FIG. 1A is a perspective view of a notebook computer, one type of computing device in which the method of the present invention can be utilized.
Figure 1B:
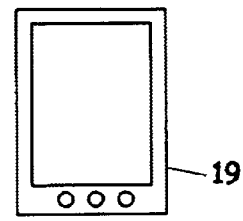
FIG. 1B is a front view of a palm computer or personal digital assistant, another type of computing device in which the method of the present invention can be utilized.

FIGS. 1A and 1B illustrate two typical computing devices on which the invention can be implemented. A notebook computer and a personal digital assistant are shown, but other types of computers can be used, including both portables and non-portables. Suitable computers may include, without limitation, desktop, laptop, notebook, palm computers, and programmable digital assistants. The computer is equipped with standard multimedia capabilities which allow it to record and store audio on in the computer's memory, which for purposes of the invention can mean any type of memory, including RAM and other direct access storage device as well as various forms of writable magnetic and optical disk storage devices. The multimedia capabilities include a analog to digital converter and a digital to analog converter. Usually, the memory will be RAM and/or a hard disk drive (not shown). Other types of storage devices can be used as well, such as flash memories. The multimedia recording capabilities will usually be provided as an integral component of the computer. However, it can also be provided by physically attaching a multimedia recording device external to the computer, as for instance via the parallel port, Universal Serial Bus, or PCMCIA slot of the computer. As is shown in FIG. 1A, the multimedia hardware is usually formed as an integral part of the computer, supplemented by an external microphone.

The preferred embodiment of the current invention is directed primarily to sound recording and playback. However, the invention may also be used with video in addition to sound. All that is required is hardware and/or software support for video recording and playback and a camera that is capable of feeding the computer with video images. Many computers can display video on their main display, either in a window or as a full screen image. Thus, video playback can be accomplished using either the computer's display or an external television monitor. The computer implemented process disclosed below is the same, except that wherever the computer directs the multimedia hardware to start recording or playing sound, or determining or changing the status of the audio device, the corresponding video commands are issued in addition to or instead of the audio commands.

These audio and video commands are usually an integral part of the computer's multimedia capabilities. Most compilers come with an application programmer's interface (API) for multimedia that gives a computer programmer access to the commands that cause a computer to record and play multimedia files.

Many notebook computers include an internal microphone that is an integral part of the computer. Usually, it is located near the keyboard and is provided for such things as recording short voice annotations or issuing spoken commands to the computer. These internal microphones tend to be very susceptible to noises produced by the computer, such as fan hum, disk drive hum, disk drive seek noises and keyboard clatter. This is not a problem when recording a few words spoken directly into the microphone. During such a time, use of the keyboard can be avoided. If the disk drive is too noisy, power-saving functions can silence it by shutting it down. With the disk drive off, the recording time is limited by the amount of physical RAM or other solid state memory installed in the computer. This may give a few seconds to a few minutes of recording time, depending on various factors including the amount of RAM available and current audio recording configuration.

Some of these internal microphones may be usable with the invention under favorable conditions. However, because distant voices are very susceptible to being drowned out by the computer's own noises, most users would usually prefer an external microphone. The invention, by its nature, is designed to be used while the keyboard is in use and the disk drive is in operation. A quality external microphone is not as likely to pick up interference from the operation of the computer. Also, the user would usually want to use a microphone that approximates the sensitivity of the human ear and can pick up voices from across a room. Many commercially available microphones would qualify, including without limitation quality electret condenser and dynamic type microphones.

Computer noises can interfere either because the microphone can "hear" the noises or because the microphone wires and audio circuitry pick up electrical signals generated by the computer. These electrical signals often have an audio frequency component. If an external microphone suffers from interference, it is probably electrical interference. Using shielded cables might help. If that does not completely solve the problem, the microphone signal should be amplified to line level before it comes near the computer. The line level input that is provided with many multimedia notebook computers is typically much less susceptible to interference than the microphone level input.

Currently, it is difficult to find a suitable preamplified microphone or a suitable preamplifier at a reasonable cost. Most of the available preamplifiers are designed to be mixers or have other audio functions that make them unnecessarily bulky and expensive for this invention. Many also require a separate connection to an AC power source, which is an inconvenience for this invention. Thus, while it is by no means necessary for use of the invention, this invention also may be provided at a higher price with a preamplified microphone. This microphone would be of the type that can "hear" somewhat similar to the human ear and have within the same case an integral preamplifier to line level. It should be powered by a small battery that is also in the microphone case and have its own on/off switch. Alternatively, if a special connection is designed for a particular notebook computer that is sold as part of the invention, the notebook computer should power the microphone and preamplifier. Power from the notebook computer should be filtered with at least a decoupling capacitor and/or a voltage regulator to minimize noise.

It is possible to provide a notebook computer with an internal microphone designed particularly for this invention. This microphone would be placed away from the keyboard, preferably hidden behind the LCD screen (from the keyboard user's point of view). For an integral microphone, this would be a better position to avoid internal noises and pick up the voices of teachers and other lecturers in a classroom setting. As before, the microphone should be sensitive enough to clearly pick up distant voices about as well as the human ear does. The wires connecting the microphone to the computer's analog to digital converter (ADC) should be a coaxial cable or at least shielded to minimize interference. However, if room can be found near the microphone without increasing the cost too much, it is even better to digitize the signal or to amplify it to line level near the microphone.

Figure 2:
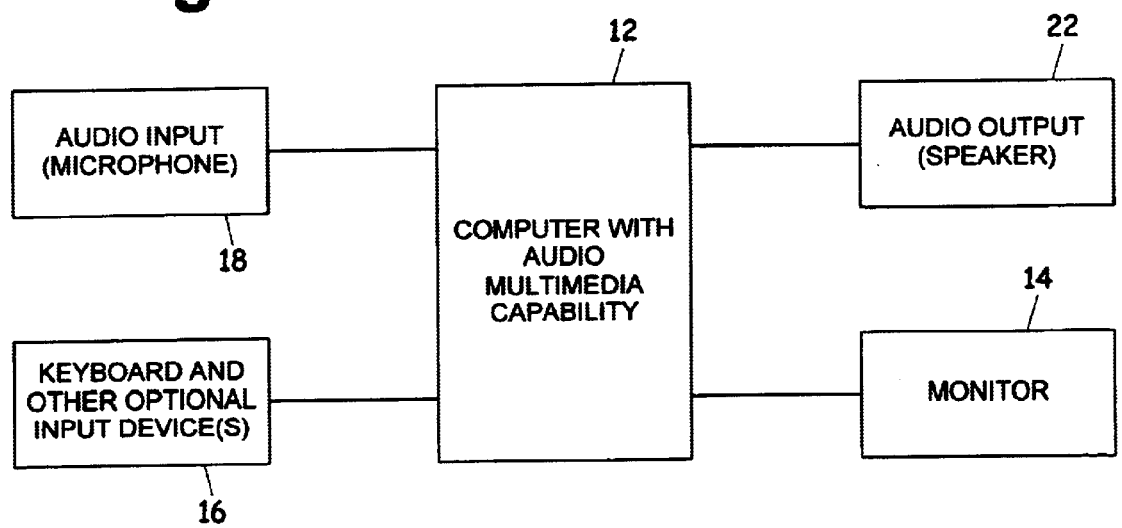
FIG. 2 is a functional block diagram illustrating the interconnection of the hardware components of the invention.

As FIGS. 1A, 1B and 2 further illustrate, the computer is equipped with a display and a keyboard that permit the user to interact with the word processor that is being executed by the computer. Finally, the computer system is equipped with an audio output device such as headphones, which permit playback of the audio recording. The audio output device could also be an audio speaker or two, implemented either as internal or external components of the computer. Any voice-grade speaker is suitable. Many computers already have such a speaker built in.

As shown in FIG. 1B, the computer may use pen-based input instead of a keyboard. If the pen-based computer recognizes hand drawn letters and converts them to characters, it passes the characters to the invention just as a keyboard would do. If it does not attempt to recognize hand drawn letters, then a separate letter-recognition program may be inserted between the pen-based computer and the invention. On the other hand, recognition of letters is not required for the invention to function. The invention may store and use the pen-strokes themselves as sketches.

As is well known, computer performance varies widely from one computer to another. The performance of a particular computer system may put a limit on the clarity of the audio data being recorded and played. Fortunately, a computer system does not have to be capable of recording and playing back CD-quality sound for extended periods. Experiments have shown that recording and playback of the standard 11,025 eight-bit samples per second is more than adequate for most uses. This corresponds to approximately telephone-quality sound. Recording at this rate without compression consumes about 39 million bytes of storage per hour. Typical disk drives are many times this size. Also, the invention contemplates that the same free space will be reused over and over.

To capture weak sounds, such as a distant or quiet voice, it may help to record sixteen-bit samples. Then, if necessary the volume can be increased substantially by either digital or analog means to make the speech more audible. This is because weak sounds may be recorded only in the least significant bits of the eight bit samples, if at all, and any information that would have been recorded in the 9th or even lesser-significant bits is lost. The absence of more than eight bits causes a slight hiss called quantization noise. Normally, quantization noise is so slight it does not interfere with comprehending recorded speech. When a weak sound is recorded with sixteen-bit samples, the 9th through 15th bits are present and the recording loudness can be increased with much less quantization noise than eight-bit samples.

On the other hand, when high pitched sounds are present, they can distort the audio at any volume level. Background music recorded at 11,025 samples per second can turn into noise that makes it very hard to understand speech. The solution for high pitched sounds is to record more samples per second. Usually, 22,050 sample per second will be more than adequate. It is easier to understand speech when background music is recorded accurately than when it is distorted.

FIG. 2 is a block diagram illustrating the computer system of FIG. 1 in a functional manner. This is an example computer system only. The invention may still be used with other types of input and output devices than those shown. The audio input and audio output devices do not have to be connected to the computer system at the same time. The monitor is any display capable of displaying text or graphics.

Overview of Ways the Invention May be Used

As the invention is designed to be used under a variety of circumstances and by a variety of users, certain modes and details of operation are matters of choice for users to determine and change from time to time, according to the users' desires and circumstances. These details of operation are collectively called "user preferences." These user preferences allow the user to select or alter certain behaviors of the invention, including such things as when to establish audio links and how to use audio links to control replay. The specifics of the various user preferences will be discussed throughout the specification. The user may alter these user preferences at any time, including prior to using the invention for the first time.

The invention may be used in many ways. Several important ones are illustrated in FIGS. 3A–E. These figures are illustrative only and do not represent all of the ways the invention may be used.

Figure 3A:
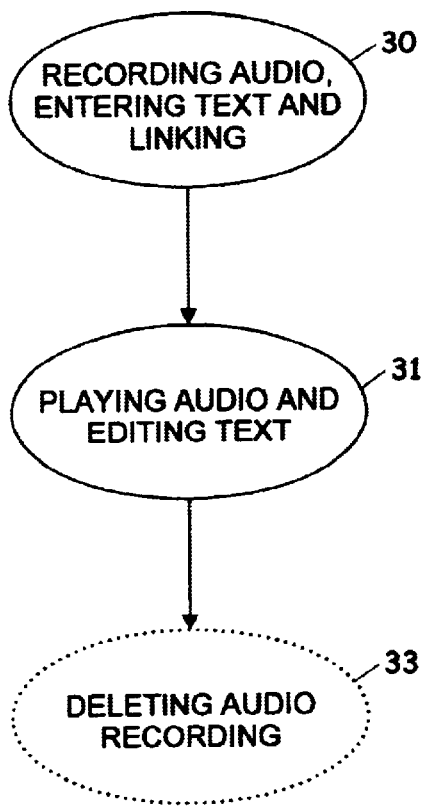
FIGS. 3A, 3B, 3C, 3D, 3E and 3F are flowcharts illustrating some examples of ways the user may wish to use the modes of operations of the invention in stages.

FIG. 3A shows the basic use of the invention. The first step is to use the invention to make a recording of an audio event and at the same time enter text via the computer's keyboard. As the text is entered, the computer establishes links between the text file and the corresponding portion of the audio recording. According to the invention, these links are called "audio links," or just "links." The audio links associate a particular point in the text file with a particular point in the audio recording. The audio links are generated upon the occurrence of events, such as the beginning of a new word, sentence, line or paragraph, or in other ways, as predetermined by user preferences. As used herein, "text file" includes any type of textual data, whether in main memory (e.g., RAM) or permanent storage (e.g., a disk drive). A text file may include formatting codes and other codes as well as audio links. When the audio event is over, the user stops the recording function by pressing a stop button or otherwise issuing a stop command. The invention remains in edit mode after the recording function is turned off.

When the audio event is over, the user is no longer under pressure to keep up with the audio presentation, such as keeping up with a lecturer or other speaker. The user has time to complete or otherwise improve the notes. In the event the user was able to satisfactorily complete the text notes without reviewing any part of the recording, the user may skip the play step and go directly to the audio deletion step. This can occur, for example, when the user was able to take adequate notes during the audio event because the speaker did not say many things worth taking down, or the important parts were brief and spaced apart.

However, the user's notes at this point will often be incomplete or inaccurate. The next step shown in FIG. 3A is the play and edit step. During play and edit, the user may review any part of the recording to improve the notes taken or verify their accuracy. The user places a cursor in the text file somewhere that corresponds to the audio portion that is of interest and initiates a play command. The computer then plays back the desired audio, which was the audio recorded when the text near the cursor was first entered into the computer. The details of exactly how this is done depends on the user preferences currently in effect. Generally, the user uses the caret (the caret, often a blinking line under keyboard control) or a pointing device 15 to indicate the portion of the text that is of interest. This in turn lets the computer find a portion of the audio by following the audio links. The user can edit the text file during playback. In this way, the user can complete word fragments, sentences fragments, and ideas. The user can transcribe exact quotations of any length, up to and including a word-for-word transcript of the entire audio event, if desired.

A feature of the invention that makes it particularly convenient to transcribe quotations is called lockstep. When the relevant portion of the audio is found using the audio links or otherwise, the user may issue a "Play lockstep" command. This will cause the computer to play a few seconds of audio and stop. Specifically, it will play the audio starting from a predefined point relative to its current position in the recording, continue for a predefined time, and stop. Thus, with the right predefined times, successive play lockstep commands each play slightly overlapping segments of audio. Each of these segments is short enough for the user to transcribe the audio completely. An overlap time of 0.7 seconds and play time of 3.5 seconds works well. As soon as the audio segment is transcribed, the user issues the next "play lockstep" command and transcribes the next segment. This can continue for as long as desired. The computer may optionally retain audio links corresponding to each lockstep segment. Such lockstep audio links facilitate replaying portions of audio that start and stop within just a few words of the corresponding portion of the text that is selected for replay.

Figure 3B:
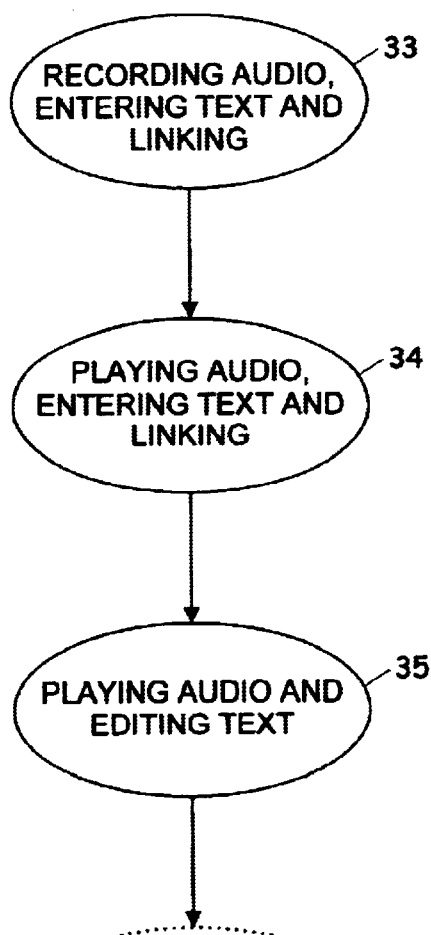

FIG. 3B shows another way to use the invention. One of the benefits of this way is that it allows greater participation in the audio event. Another benefit is that it minimizes disturbing others with keyboard noise. This method is similar to the way shown in FIG. 3A, but has an additional step, "playing, entering text and linking." During this extra step, the user may play back the selected portions of the audio recording while entering text, and also establish new audio links for this new text.

An example of such use would involve several steps: During the audio event, the user enters short comments and directives such as "important," "get quotation," "unimportant," "listen again," or the like. Brief notes of a substantive nature may imply these directives. Even individual letters would work, given that the user preferences make an audio link for each character.Later, during the extra step, the user listens again to the important parts of the recording and types in a first draft of substantive notes. If the audio recording goes by too fast for the notes to be complete, as can easily be the case, the user may complete the notes in the third step. This third step is play and edit without linking. When the notes are complete, the audio may be deleted.

Figure 3C:
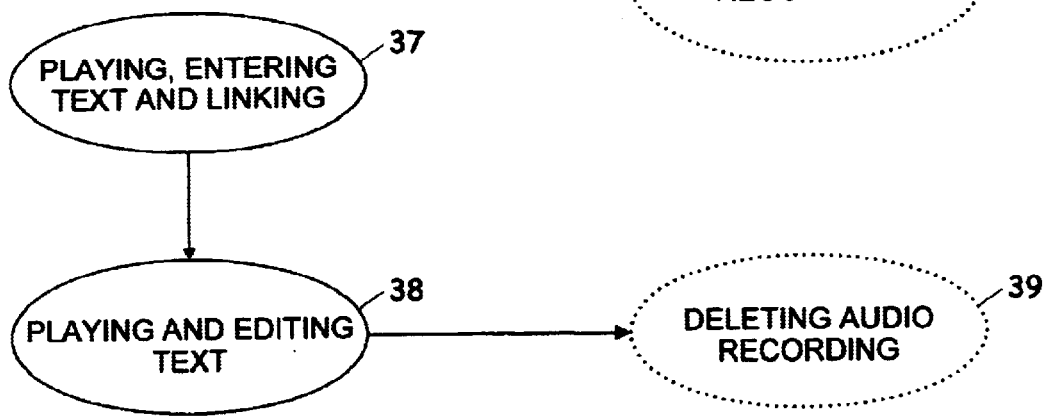

FIG. 3C shows a third of the many ways to use the invention. This method may be used when the audio recording was made previously and is already available on the computer's storage device. For example, the recording could have been made with ordinary audio recording application software or by the invention used as an ordinary recording application (e.g., linking mode was off or the keyboard was unattended). Thus, the recording is not associated with any audio links yet. The method is like the method of FIG. 3A, except that the audio is played instead of recorded. Everything else operates the same way.

When using the method of FIG. 3C, the user has the option of stopping or pausing the audio as needed to keep up. However, it is recommended that the user first play the entire recording through and refrain from stopping the audio to keep up. Thus, the user gets an overview the subject matter before deciding which details are worth the time to review and improve the notes on, since some things will be made clear through repetition and will not need to be reviewed. Of course, there is nothing wrong with stopping the audio to take a break.

Figure 3D:
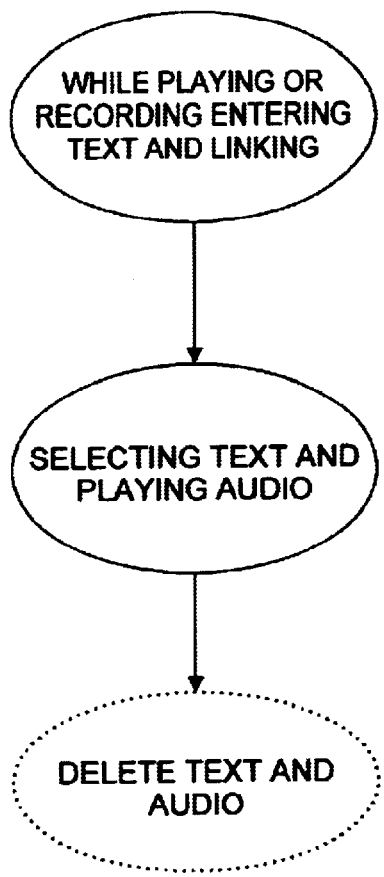

FIG. 3D shows still another use for the invention, which is to quickly prepare for a multimedia presentation. This is done by making an index of the audio (or audio/video) event. This index is prepared by recording (or playing) the audio event and typing words or phrases that describe its various parts. After this step, further editing of the text is probably not necessary. Later, this index can be used to immediately access any part of the audio recording. The end result of this alternate purpose is not notes; it is a digital audio recording that can be accessed randomly by selecting key phrases of text. Thus, the user would not want to delete the audio when the text is finished. Nothing would be deleted until the purpose for making the indexed recording had been fulfilled. Then as a final optional step the user would probably delete both the audio and its textual index together.

Creation of an index is facilitated by a special type of audio link called the cue audio link. Cue audio links are inserted by an explicit command, such as pressing a function key. Cue audio links are characterized by the ability to mark exact points in the recording so that replay begins substantially at these exact points, without any delays intended to compensate for the user's reaction time.

Figure 3E:
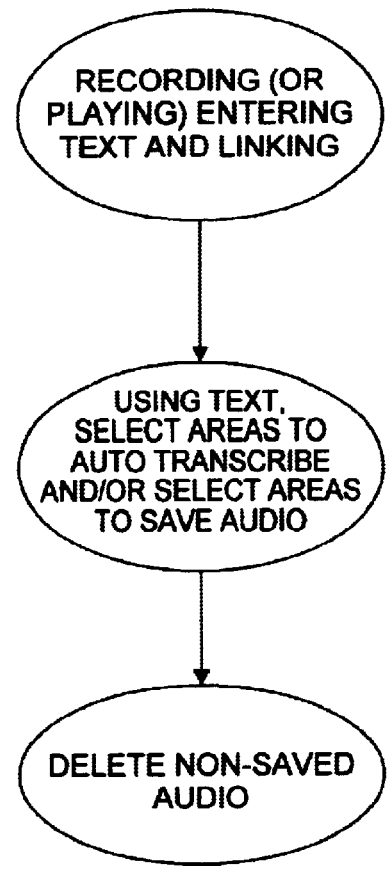

FIG. 3E shows yet another use of the invention, in which the text is used as a "handle" to specify and selectively save or delete portions of the audio. Some implementations of the invention may include automatic voice to text transcription capability. A similar method of selecting portions of the audio can be used to select portions of the audio that are important enought to transcribe into text.

Figure 3F:
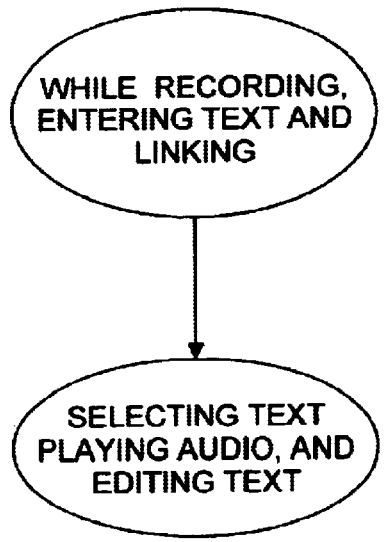

FIG. 3F shows yet another use of the invention, in which in one window, the user is recording an event and occasionally taking notes thus creating audio links into the recording. When the user does not need to be entering notes in the first window, the user can open a second window and display the notes of another event, such as another college class. The user then plays the audio links in the second window into an earphone and completes the notes of the other event. The first window continues recording, so the user is in no danger of missing anything important by dividing his or her attention between two tasks or the notes taken earlier during the event that is now recording.

The invention may also be used in variations of these ways or other ways not shown. For example, sometimes an outline of an audio event is available in advance, either because the user is the speaker or because the speaker provided the outline to the user. The user can enter the outline into the computer before the event. Then, during the audio event, with linking only or editing and linking functions active, the user can easily indicate to the computer when the speaker moves from one topic to the next. After the audio event, any portion can be replayed instantly without searching simply by selecting audio links in the outline. Still another use is to have the invention save the notes and at least some of the audio as an HTML file and one or more audio files that the HTML file references in audio hyperlinks, and then posting these files to a computer network such as the World Wide Web, the Internet, or an intranet.

The Main Screen

FIG. 4 shows the main screen 40 of the invention. Much of the content is optional and the arrangement is a matter of design. Shown is the top level menu 41, an audio controls bar 42, a track bar 50, a selection bar 80, a large text edit area 62, and a shortcuts bar 68. The audio controls bar 42 includes an audio button bar 70–77, other audio controls 45–46 and indicators 47–49. The track bar 50 includes a slider 51 and various markings. The selection bar includes several pull-down selection boxes, such as a session time and date selection box 55. The shortcuts bar 68 includes a pointing-device-aware list of common commands and their one-keystroke shortcuts.

The Main Menu

The top level menu represent the various pull-down menus that are available. These menus include customary menu items and some unique menu items. The "View" menu, among other things, lets the user choose whether the various types of audio links are visible or invisible in the text. It also lets the user choose whether the track bar and audio control buttons are visible. When the track bar 50 or audio controls bar are not visible, then the text edit area is enlarged to utilize the space they leave behind.

The "Audio" menu allows the user to use the menu to control the same things as the audio button bar 43, i.e., "Play," "Pause," "Step Back," "Stop," "Step Forward," "Record," "Linking Mode" and "Save Audio." Step back and Step forward move the current audio position a predetermined time, such as five seconds. They are enabled when audio is playing, stopped or paused. Other menu items the Audio menu should provide include an "Okay to Break Silence" menu item and a "Play Lockstep" menu item. The Audio menu may also provides control over audio sample rates and sample sizes and whether linking is active, but a preferred place for this is in the user preferences.

The "Preferences" menu allows the user to view, select and change the various preference sets. Alternatively, this menu could be an item in the "Audio" menu.

The Audio Tool Bar

The audio button bar 43 controls the audio recording functions. The buttons are play 70, pause 71, step back 72, stop 73, step forward 74, record-75, linking mode 76 and save audio mode 77. Step back and step forward are provided because it is often desirable to make small adjustments after an audio link has taken the user to approximately the desired place. When held down in play mode, they quickly review and cue the audio, respectively. This can be done, for example by repeatedly playing short segments of audio (eg. 0.25 sec) and skipping longer segments (eg, 2 seconds).

The other audio controls and indicators on the main screen are optional, but they are of great convenience to the user. Without them, the user may have to make adjustments in another window or even in another application. The controls include an microphone input level control 45 that lets the user determine the current audio input sensitivity. (Another control that may be provided on the main screen lets the user select between the computer's microphone or line-level inputs.)

The intensity indicator 47 simulates an array of green light emitting diodes (LED's). However, the "higher" LED's can display in yellow and then red to indicate the level is too high. The indicator flickers during recording to indicate the intensity of the sound being recorded. This provides visual feedback that everything is working normally during recording. The volume control 46 is separate from the microphone input level control 45. The recording indicator 48 simulates a LED that is "glowing" solid red during recording and blinking red when the invention is in recording mode but is discarding the audio data for one of several reasons discussed below. A speaker icon 49 may or may not have a red circle and slash symbol over it, to show whether "silence protection" feature is in effect.

The invention may optionally be provided with a speed control or even both speed and pitch controls. The speed control changes the playback rate of the recorded audio. The pitch control adjusts the pitch of playback. Preferably, the ability to adjust both speed and pitch is provided in some form.

If the speed and pitch controls are truly independent of each other they will appear to the user to be dependent on each other. For example, increasing the speed to 150% will result in an increased pitch, that has to be compensated for by adjusting the pitch control. Thus, preferably the user is given a speed control and a checkbox or button for automatic pitch compensation. With automatic pitch compensation in effect, changing playback speed to 150% is accompanied by an automatic pitch reduction to 67%. This makes recorded voices sound like their original pitch, but spoken faster. When automatic pitch compensation is in effect, the pitch control may be either unavailable or available for further adjustments. When automatic pitch correction is not in effect, both speed and pitch controls may be provided, but the speed control is more important.

The speed and pitch settings in effect are saved when a file is saved and they are restored when the file is opened. The default speed is 100% and the default pitch is 100%. By default, automatic pitch compensation is in effect. The default controls that are visible includes the speed control and a checkbox or button for automatic pitch compensation.

The Track bar

A convenient optional feature of the invention is a track bar 50 for graphically displaying the audio recording as a time line. This track bar 50 is labeled with the time of the day 53 when the audio was originally recorded. As the audio is being played, a slider 51 moves slowly along the track 52 to show the current position playing. This slider 51 can be picked up and moved with a pointing device 15 to randomly access any point in the recording. Preferably, the slider may be moved while audio is playing without immediately interrupting what is playing. When the slider is "let go" at a new position, then the audio should immediately start playing from the new position.

During recording, the slider 51 is positioned at the point in the audio recording where the new audio is being inserted or added. Usually, this will be at the end of the audio and will be indicated by the right end of the track bar 50. The time labels 53 should be updated periodically as needed to reflect the increasing length of the recording. Thus, the time labels 53 will appear to be shrinking or compressing as additional time is added on the right end. Occasionaly it will be necessary to relabel times to prevent the time labels 53 from running into each other.

The invention will likely be used to take notes at a series of similar events, such as class meetings of a college course. The notes of each course can be kept in a separate word processor (style) file, and the notes of class meetings (the events) can be kept in the same word processor file, if the user so chooses. Each such event can result in a recording session that is several days apart from other sessions. The, invention accommodates multiple sessions being accessible from the same text file by providing a session selection box 55. This box displays the day, date, begin time and end time of the current session that is displayed on the track bar 50. The selection box 55 may be temporarily expanded to display other sessions for which some audio is still available. Any one of the other sessions may be chosen to become the new current session. When this happens, the track bar time labels 53 are updated. The current session can also be changed by a play command arising from the text and audio links.

Optionally, multiple sessions can be selected and displayed as multiple individual track bars to provide a graphical overview of all of the audio available. These track bars appear as discrete divisions of the normal track bar, each with its own independent time scale. Also optionally, the "View" menu contains a "Sessions" item. When selected, this command opens up a dialog box with a large graphical window. The window displays at least part of an area that has the window's width and any height. The window contains a full-width trackbar for each session available, with the trackbar for the earliest session at the top and the trackbar for the latest session at the bottom of the scrollable area.

A session may include small gaps 54 in the recording. These gaps 54 can be caused during recording by selective saving of audio or after recording by selective deletion of audio. The track bar 50 displays the location of gaps 54 by a slight change of color in the track 52. These gaps 54 do not separate the audio into distinct sessions. The invention can easily distinguish gaps 54 from sessions. A change of session is indicated by closing and opening a text file, or terminating and restarting the software program.

There are some uses of the invention for which the time and date of recording have no meaning, such as when recording a musical track. (A user may do this, for example, to comment on the music or to access various parts of it for use in a presentation or discussion.) For such recordings, the user may choose to display the number of hours, minutes and seconds into the recording, instead of the time of day of recording.

The track bar 50 may also be used to display tick marks 56 for each audio link present in the text, mapped out according to time. This identifies important times during the audio event, as measured by the density of audio links generated. The user should be able to select which kinds of audio links show up as tick marks 56. Preferably, to reduce complexity and maintain consistency, audio links that are selected to display in the text 57 should also be displayed as tick marks 56 on the track bar 50.

Most word processors allow the user to select text using a text highlight selection process. Typically, the user can do this by holding down the Shift key while pressing cursor movement keys. Typically, it can also be done without using the keyboard by clicking and holding a pointing device button while moving the pointing device 15. On some word processors double clicking on a word will select the entire word and more clicks will select sentences or paragraphs. The highlighted text can be shown in various ways, such as swapping the font and background colors, replacing font and background colors with their complementary colors, or any other method that distinguishes selected and nonselected text. When this highlighting or reverse-color style selection is done on the current invention and the track bar is in view, the preferred embodiment of the invention will simultaneously highlight the corresponding portions of the track bar as directed by any audio links that may be in the selected text. Each audio link selected highlights the track bar from its point in time until the next-intime audio link, whether selected or not. Thus, if the user skipped around in the text during linking, these audio portions may be disjoint segments. If the user did not skip around, it will be one continuous segment. These methods apply to both visible and invisible audio links. If the selected text includes audio links to more than one session, the track bar may be redrawn to show the multiple sessions as individual smaller track bars. A selected audio link should cause a change in the track bar that is at least a one pixel wide. If several audio links map to the same pixel-wide portion of the track bar, that portion of the track bar should be highlighted if any one or more of the audio links is selected.

The Shortcuts Bar

Along the bottom of the main window is a shortcuts bar 68, which has a selection of common commands and their one-keystroke shortcuts. These commands can be issued by typing their shortcuts or by clicking the pointing device 15 on the commands themselves. By using the View menu, the shortcuts bar 68 can be hidden to expand the size of the text edit area 62. The pointing device can also be used to pick up an edge and either make it visible or hide it.

The "Link" command 90 creates an express audio link. As with most audio links, express audio links assume there was some delay between the time the audio became important and the time the user could hit the F1 key or otherwise create an audio link. This delay is mainly a combination of recognition time (the time the user requires to recognize the importance of the audio) and reaction time (the time required to take action on the recognition). The computer itself may introduce some delay, called computer latency, but this would normally be negligible in comparison to the other two sources of delay.

The "Cue Link" command 91 does the same thing as the Link command 90, except that there is no compensation for the user's delay. (If necessary and possible in a particular implementation, the invention may compensate for computer latency.) Preferably, the Cue Link command is a separate command from the Link command 90, as shown h ere. Less preferably, there is only one express audio link command that performs either r of the two functions depending on the delay setting in the user preferences. (See reference number 184, discussed below.) The "i cue link" command 91 can also be called "cue."

The Text Edit Area

According to the invention, the user can edit text that contains audio links. If the audio links are visible they are treated just like single characters. Individual audio links or text containing audio links ma y be deleted, passed over with the cursor keys, selected, copied, cut and pasted.

The editing of text when the audio link is not visible is a bit more complex. The preferred way of handling this is to have the audio link behave like a single character that is invisible to delete commands. Thus, if the caret is to the right of an audio link and the user presses the backspace key once, the audio link will be unaffected and the character to the left of the audio link will be deleted. Likewise, if the editor is in typeover mode (and not insert mode), typing a character would always replace an other character, leaving the audio links alone. If editing results in two audio links touching one another, the computer may delete the later-in-time audio link.

The text edit area 62 generally operates similar to ordinary word processors in such things as word wrap. However, ordinary word processors are primarily document preparation tools and tend to follow a document model, meaning that the word processor attempts to display text approximately as it will appear when it is printed as a document. This feature is often called "what you see is what you get" (WYSIWYG). On the other hand, the purpose of the current invention is to capture text and audio/video in real-time and not so much to prepare documents. Thus, in the preferred embodiment, the invention departs from ordinary word processor behavior and operates in a "real-time" mode of operation. It may provide both real-time and "document" modes of operation. These modes are optional features of the invention.

The first difference in the real-time mode has to do with soft line break (soft returns). In the WYSIWYG model, placement of soft line breaks is determined according to document margin width and is independent of window width on the monitor. If there is not enough window space to display a whole line, then horizontal scroll bars appear. These horizontal scroll bars are inconvenient to use in real time. Thus, in the real-time mode, soft line breaks are determined by window display width. A change in window size would not cause horizontal scroll bars to appear, but likely will result in adjusting all the soft line breaks. (Of course, some users may wish to disable this mode so they can use the invention with a document model.)

The second difference in the real-time mode has to do with the display of page breaks. In the WYSIWYG model typically used in an ordinary word processor, page breaks are shown on the monitor. Sometimes the top margin and bottom margin are also shown. This can cause situations where text that flows off one page onto the next is separated by a large gap. Also, moving the caret from one page to the next can cause the text to unexpectedly jump up or down, momentarily disorienting the user. Thus, to make the invention more adapted for real-time use, it is preferred that in the real-time mode the invention does not display page breaks at all (or at least not the top and bottom margins at page breaks). The invention may nevertheless display the caret's page number somewhere outside of the text edit area 62, such as in a status bar (not shown) just under the text edit area 62. (Such status bars are common in the prior art.) This page number is as computed according to the format information that controls when the invention is not in real-time mode.

The two modes should be a resource for the user, not a constraint. For example, the invention should be capable of recording and linking in document mode, even with horizontal scroll bars present. It should also be capable of printing in real-time mode. These modes are just two paradigms or models for displaying the text in the text edit area 62. Some implementations of the invention may provide only one or the other.

The user should not be forced to frequently switch between real-time and document modes. For a given file, it is expected that the user would normally keep the invention in one mode or the other all the time. The current mode would be saved in the text file and restored when the file is opened. The current mode is changed by toggling a "WYSIWYG" item in the "View" menu.

The Word Processing Tool Bar

The invention may also provide a conventional word processing tool bar (not shown). It may include tools for changing attributes of the text, including such tools as a bold button, italic button, underlined underscore button, justification selection box, outline modes, and so on. If provided, it would be an alternative place for the font selection box 85 and font size selection box 86. The view menu would include a menu item that makes the word processing tool bar appear and disappear, just as it does with the audio controls bar 42, the track bar 50, the selection bar 80, and the shortcuts bar 68.

The Sketch Tool Bar

The invention may facilitate the drawing of sketches by providing a sketch tool bar (not shown). The sketch tool bar would operate similar to what users would expect from having used commercially available software for charting, painting and drawing, including the various versions of Paintbrush that comes with MICROSOFT® Windows version 3.1 and/or Paint that comes with MICROSOFT® Windows 95 and 98. The sketch tool bar may include a selection of buttons to do things such as automatically draw lines, rectangles, squares, ovals, circles, or even smart shapes such as pie charts, graphs and histograms. (Smart shapes allow quick customization of the data they show while following the rules of pie charts, graphs and histograms). It may include tools to draw like a pencil, paint brush or air brush, or to draw lines in segments or curves, or to fill areas with color. Of course, it may also include tools to select various colors.

When the user draws sketches with the invention in linking mode, the invention attaches an audio link to every new element (e.g., line, box, color fill, etc) that the user draws, assuming the "Make audio link . . . For sketches" checkbox 158 is checked. Later, the user can use a selection tool to select an element and start replay from its audio link using the regular play commands. If the user selects several elements up to and including a whole sketch and plays the audio, it will start from the first-in-time audio link. The area(s) selected will be highlighted on the track bar. A faster way to initiate replay is to click on an element of the sketch without any drawing tools being active.

Tool Bars Generally

A convenient optional feature is that the audio controls bar 42, track bar 50 and word processing tool bar (not shown) are movable by the user to any of the four edges of the text edit area 62 and also to one or more floating windows. A bar at the edges takes space away from the text edit area 62. As a floating window, it always "stays on top" of the text edit area 62 (i.e., the window(s) remain visible while editing text). The selection bar 80 and the shortcuts bar 68 tend to be horizontally oriented. Preferably, they are movable by the user to the top or bottom edges of the text edit area 62 or to a floating window. The bars should indicate their mobility by changing the pointing device cursor 63 to a hand when the pointing device 15 is on an otherwise unused portion of the bar. Clicking and dragging will then move the bar. This feature is common in the prior art for tool bars generally.

User Preferences and the Edit User Preference Dialog Box

The main window also includes a Current Preference Set selection box 98 that allows the user to choose one of several user preference sets. Simple implementations of the invention may only support one default preference set that is always active, e.g. a simple palm computer 19. Also, even in a full implementation of the invention, it is preferred that users not be required to deal with preference sets to use the invention. Only a few "power users" will care to understand them and want to use them. Thus, upon first use of the invention, usually after an installation, for example, a default preference set should be active. Other choices in the Current Preference Set selection box 98 should be reasonable. The name given this box should be something like "Type of event" and the "custom" option should be labeled "expert" to warn unsophisticated users.

The user preferences can adapt the invention to a wide variety of distinct usage styles, operating conditions, types of audio events, and end results sought after. For example, a user who is a student may want to activate one set of features in a math class and a different set of features in a history class. The preferred embodiment of the invention allows the user to save a combination of user preferences as a "preference set" or a "configuration." The user may give this preference set a descriptive name. More than one preference set can be saved at once, but only one is active at any given time. The preferred embodiment also provides for the user to view the various preference sets that have been saved and to switch to or activate any preference set at will. The invention should be provided with several standard preference sets. The user may use these as they are or modify them to create custom preference sets with new descriptive names.

Another optional feature of the invention is that in addition to the descriptive name, a longer explanation of the preference set may be made available for review. The user may display the longer explanation in a small popup window by resting the pointing device 15 on the descriptive name wherever it is shown. This explanation can include a memo field and a computer generated summary of where the preference set differs from a base preference set. The base preference set is usually the default preference set that is active the very first time the user uses the invention. This is the case for all preference sets provided with the invention. However, if the preference set for which explanation is sought was created by copying and modifying a preference set other than the default preference set, and if it still bears the name of the original preference set, then it has a different base preference set. It is expected that non-default preference sets provided with the invention would be used for base preference sets most often, but any preference set can be a base preference set.

A convenient way to maintain preference sets is shown by the Edit User Preference Sets dialog box 100 in FIGS. 6A–6D. This dialog box is activated when the user selects a menu item such as Edit Preference Set (not shown) in the Preferences pull-down menu. Another way to activate the dialog box is to double click on the main window's Current Preference Set selection box 98. To make the invention easy to learn and use, a third way to activate the dialog box is to make "Edit Preference Sets (expert)" one of the choices among the list of user preferences displayed when the user pulls down the selection box handle 99.

The Edit User Preference Sets dialog box 100 contains a Current Preference Set selection box 102 similar to the main window's Current Preference Set selection box 98. These two selection boxes are synchronized when the dialog box 100 is created and when the OK button 110 is pressed. Of course, the dialog's selection box 102 does not have an "Edit Preference Sets (expert)" item, since the dialog box is already active. A tabbed notebook component 120 provides a way to display and edit the preference set named in the dialog's Current Preference Set selection box 102. Various buttons provide ways to manipulate a preference set as a whole. These include an "Add" (or "New") button 104 to create a new preference set with default settings, a Copy button 105 to create a new preference set with settings identical to the one named in the dialog's Current Preference Set selection box 102, and a Delete button 106 to delete a preference set. The Copy button 105 names the new preference set "Copy of <base preference set name>." or "<base preference set name>, variation 1." The OK button 110, saves all changes and closes the dialog box. The Cancel button 111 restores the preference sets to their state when the dialog box was opened. The Help button 112 calls up explanatory documentation.

The tabbed notebook component 120 is a convenient way to present a preference set. Clicking on any tab calls up the page of controls associated with that tab. It contains tabs and pages for Recording, Linking, Playback, Speed & Pitch, and Lockstep.

Recording Page

Figure 6A:
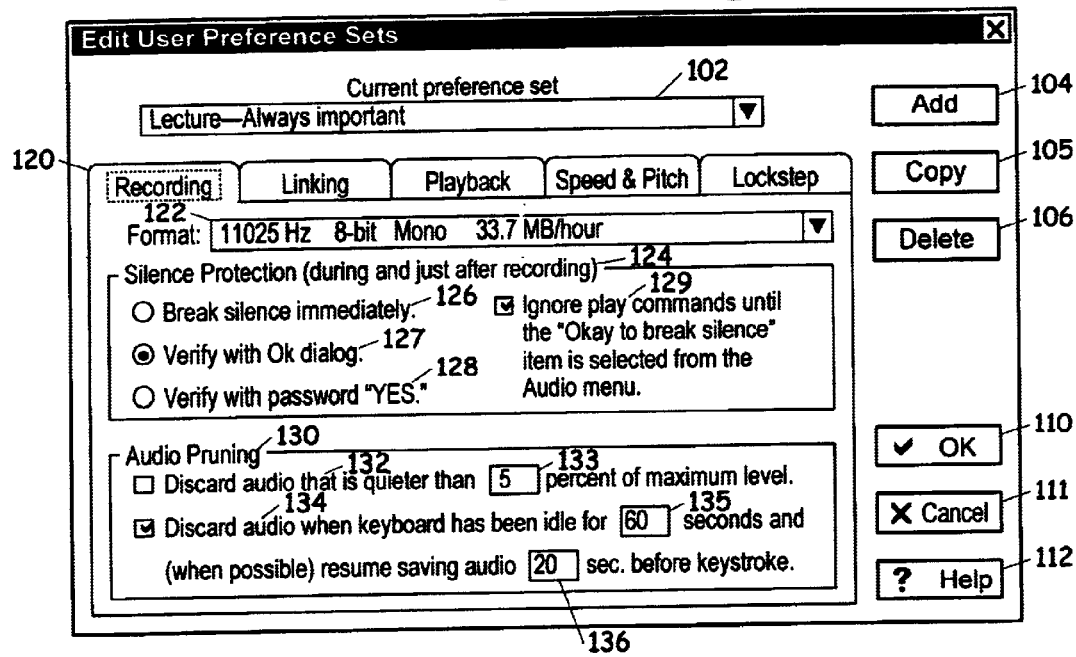
FIGS. 6A–6E show the same dialog box with different active pages of the same tabbed notebook component, for the pages "Recording," "Linking," "Playback," "Speed & Pitch," and "Lockstep," respectively.

The Recording page is shown in FIG. 6A. It contains a recording format selection box 122 and groups of controls for silence protection 124 and for disk storage pruning 130.

According to the preferred embodiment, the invention will not break the silence at inappropriate times. Some of the play audio commands can be implied by keyboard and/or pointing device events. Without protection, they could surprise both new and experienced users by inadvertently breaking the silence in a classroom or lecture hall or wherever the audio event is held. A user may also issue an explicit play command by mistake. Thus, the silence protection feature can help avoid embarrassment of the user and disturbance of others. The invention assumes it may need to remain silent in each of the following circumstances: (1) when the user begins a new session with the invention (i.e., boots the program), (2) when the computer is recording, (3) when the invention has been silent since it was last recording, (4) after the user explicitly executes an "Enter Silent Mode" command from the Audio menu, and (less importantly) (5) whenever the invention detects that the computer has been idle for a predetermined amount of time. The third circumstance is intended to detect when a notebook computer may have been moved to a different environment without terminating any applications, such as in sleep, suspend or hibernate modes. It would be better if these modes can be detected explicitly, but simply detecting a few minutes (or hours) of idle time is both sufficient and portable from one computer to another. Optionally, the predetermined time could be set in the user preferences (not shown). If coming out of these modes can be detected by the invention, then it would enter silent mode again. The state of the silent mode may be displayed on the main window 40 by, for example, the presence or absence of a red circle and slash over a speaker icon 49.

The Silence Protection group 124 contains radio buttons for selecting one of three modes. The "Break Silence Immediately" radio button 126 means that no dialog box will pop up to verify that it is okay for silence to be broken. The "Verify with Ok dialog" radio button 127 directs the invention to present a dialog box before silence is broken. This dialog box (not shown) displays a warning that a play command was issued and that silence is about to be broken. It also provides buttons for "Okay" and "Cancel." Normally, the default choice should be "Okay," even though in theory the enter key may be typed as part of the text before the user has a chance to notice the dialog's presence. This is because the enter key may dispose of the dialog quickly and because user wanting greater protection can use the next level. The "Verify with password 'YES'" radio button 128 provides protection against pressing "Okay" accidentally or thoughtlessly, such as out of habit. To break the silence, the user must type the non-secret password "yes."

The Silence Protection group box 124 also contains a single checkbox for directing the invention to "[i]gnore play commands until the 'Okay to break silence' item is selected from the Audio menu" 129. If this box is checked, all play commands are ignored without warning until the menu item is selected. When the "Okay to break silence" menu item is selected, the invention immediately seeks the level of verification indicated by the radio buttons, if any. Thus, when the checkbox is checked, the radio buttons function to confirm selection of the menu item, rather than play commands. The user may wish to ignore play commands not only as another level of silence protection, but also to avoid being disturbed by dialog boxes while taking notes in real time. If the checkbox 129 is not checked and the "Break Silence Immediately" radio button 126 is selected, then the invention provides no silence protection at all.

Some of this complexity can be simplified for the user by providing the invention as part of a specially equipped computing device that has a safe headphone/earphone jack, one that does not redirect sound to the speakers if nothing is plugged into it.

Once verification is given by the user, subsequent play commands are performed without another verification. The verification continues to be valid until one of the above circumstances restarts the silent mode.

When a verification-seeking dialog box pops up, it should include an explanation of the action that was interpreted as a play command or at least a help-type button leading to such an explanation.

If play commands are ignored, there should still be some non-modal way of informing the user that a play command was ignored. The preferred way is for a message to briefly appear and disappear. This message can appear at any place that does not interfere with the caret. For example, in the preferred embodiment, if the shortcuts bar 68 is visible, the message displaces it. To attract the user's attention to the message, the shortcuts bar scrolls back in place from the right edge a couple of seconds after the message appears.

In FIG. 6A, the "Audio Pruning" group box 130 controls certain optional features of the invention for reducing the amount of audio (and video) storage space consumed by the recording. These features are directed toward identifying unimportant parts of the audio that do not need to be saved. The "Discard audio that is quieter than 5 percent of maximum level" check box 132 directs the invention to examine the audio and not save to disk any portions that are relatively quiet. The cut off level or sensitivity is set numerically 133.

This feature acts similar to a VOX (voice activated recording) control that is available on some existing audio tape recorders. However, these VOX tape recorders usually miss recording important information at the beginning of a sound level increase. The current invention solves this problem by always capturing audio and holding it in memory for a while before discarding it. When the sound level increases, it can "go back in time" to a point just prior to the sound level increase and resume saving the audio to a more permanent storage. Thus, when pruning quiet parts, the invention should save a little audio at the beginning of a quiet period and should save a little audio that occurred before the quiet period ended. A fraction of a second to a couple of seconds in each case should be enough.

Alternatively, when the invention is recording, a VOX sensitivity control 44 similar to the other audio controls 45–46 could appear on the main window 40. This VOX sensitivity control 44 may also have an On/Off switch (not shown).

The check box labeled "Discard audio when keyboard has been idle . . . " is used for the purpose indicated. The user who checks this box is saying that an idle keyboard indicates that the current part of the audio event is unimportant and does not need to be saved. The user can adjust the number of seconds 135 the keyboard has to be idle before audio is discarded. An important part of this optional feature is that the invention can seem to "go back in time," meaning that it can save audio that occurred before the user realized it was important and started using the keyboard again. The user can set the number of seconds 136 of pre-keyboard activity audio the invention will save.

This is implemented by holding the audio somewhere in the computer for the number of seconds 136 specified by the user. Where the audio is held is normally a run-time decision that depends on the audio format 122 selected by the user, the number of second 136 of audio desired, and the amount of memory available to the currently running instance of the program. Holding it in memory is preferred since this can save battery life on a portable computer. When there is not enough memory, the audio may be held in a temporary file on the disk, a file in which the same sectors are used over and over again in a logical FIFO queue. The most sophisticated implementations of the invention may provide another check box (not shown) that tells the invention to compute an optimal number of seconds 136. When checked, the invention would use the maximum time audio can be held in memory, according to the amount of memory available and the audio format in use, and not use disk storage at all.

New keyboard activity can caused recording to resume under circumstances that would normally not create an audio link, such as in the middle of a sentence or word. Preferably, the invention overrides the normal criteria and inserts an audio link pointing to the moment keyboard activity resumed. But if it does not do this, the user may still access the audio that occurred before the first audio link by using the slider 51 or step back 72 functions.

While recording, the user can also do audio pruning manually by pressing the pause button 71 on the main window 40. Releasing the pause state will cause the invention to resume recording immediately. This behavior is usually preferred in this case because it is consistent with user expectations from existing tape recorders. However, the invention may be provided with an enhanced pause button (not shown). The enhanced pause button would be on the main window 40, in addition to the traditional pause button 71. Pressing the enhanced pause button would cause the invention to immediately stop saving the audio. Releasing the enhanced pause button would cause the invention to resume saving audio as of the given number of seconds 136 prior to the moment the pause state was released. If both pause buttons are visible, they are always snchronised in their down states and up states. Preferably, only one pause button with user-controllable behaviour is provided. When this single pause button is set to operate in its enhanced state, it should display some sort of "enhanced" design (not shown) for its image or icon, to let the user know it is an "enhanced" pause button.

Linking Page

Figure 6B:
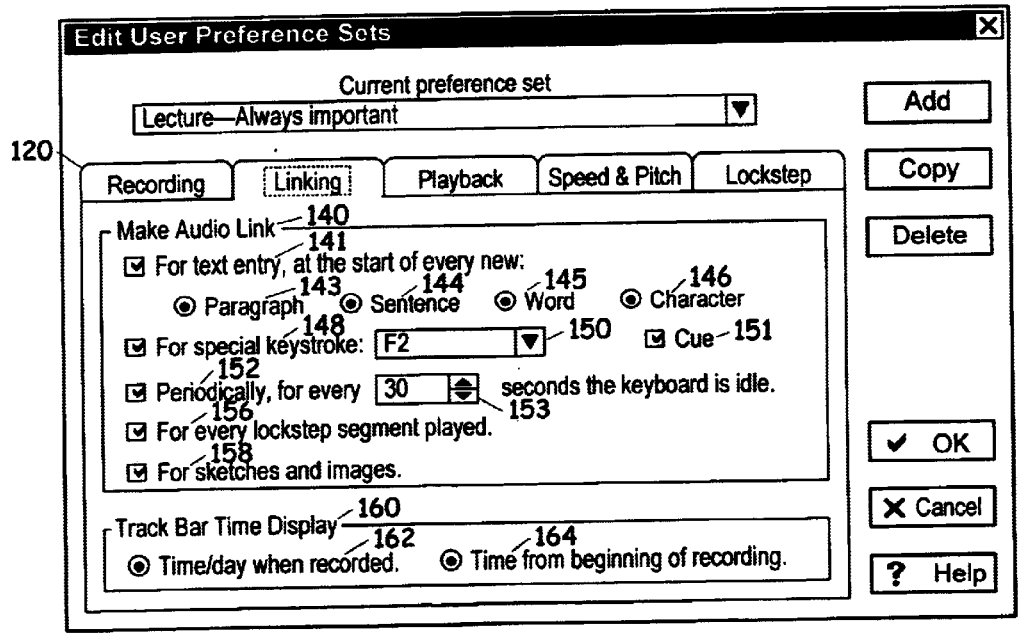

The Linking page is shown in FIG. 6B. It contains a Make Audio Link group 140 of controls for enabling, disabling and customizing audio links by type. It also contains a Track Bar Time Display group 160 of controls for determining how the track bar is displayed.

For maximum flexibility, the invention can create audio links in response to many different kinds of events. The events selected to create audio links are called "binding events." Preferably, each audio link has stored with it the type of binding event that caused its creation. Thus, there is a different type of audio link for each type of binding event.

In the Make Audio Link group 140, the user is given a choice of several types of audio links to enable or disable, together with their binding events. Some of the types of audio links (and binding events) include:

1. Text entry 141. The entry of text can generate several types of binding events. Entry of text includes, for example, typing on the keyboard and handwriting text on a pen-based input device that recognizes hand drawn letters. A set of radio buttons controls which text entry events are binding events. The preferred embodiment provides for a several that vary in "resolution", such as the following:

The Paragraph radio button 143 provides that the start of a new paragraph is a binding event. The preferred embodiment of the invention supports word wrap, as do most word processor programs. Word wrap means that text is divided into lines by the computer without the typist having to press the carriage return or enter key at the end of each line. The computer inserts and maintains "soft returns" where needed to break up the text into multiple lines. When the user presses the carriage return, this enters a "hard return" into the text file. Hard returns are interpreted as paragraph breaks. Thus, the invention can identify the beginning of a new paragraph by examining the text immediately preceding the insertion point. If the characters immediately preceding the insertion point end with a hard return or a hard return followed by only white space, then the entry of a new, ink-printable character causes a paragraph binding event. (White space includes non-ink-printing characters such as spaces, tabs, control codes to indent, etc.) The first ink-printable character typed at the beginning of a file also qualifies.

Another way of implementing the paragraph audio link is to make the typing of a carriage return a binding event, regardless of context. Some users may prefer this, so it could be an option that applies to all preference sets.

The Sentence radio button 144 provides that the beginning of a new sentence is a binding event. The invention can identify this event by checking whether the characters immediately preceding the insertion point are one or more sentence-ending punctuation marks followed by a space. Sentence-ending punctuation marks include, for example, a period, question mark, exclamation point, or any one of these followed by only a quotation mark, or a colon. To ferret out mid-sentence abbreviations and the like, the invention may additionally check the current character input. If it is a lower case letter, then it is not the start of a new sentence. If it is any non-alphabetic ink-printing character and the context is right it is treated as the start of a new sentence.

This method of identifying sentence breaks is not foolproof. It will occasionally miss a sentence break (e.g., one that is edited in later). It will also occasionally insert an audio link where there is no sentence break (e.g., "Mr. Smith"). Nevertheless, the method is useful for its purpose. It is not necessary for the invention to identify every sentence break correctly because the user can compensate for irregularity upon playback.

The invention may be provided with a way of minimizing such mistakes. Every time a period is entered, it tries to find the word to the left of the period in a list of common abbreviations, including, for example, "Mr. ", "Mrs.", "Ms." , "Dr." and so on. If the word is found, the period is ignored. Likewise, it can test capitalized words against a list of common proper names. The lists should not be so long that it hangs up the computer every time a period or capital letter is typed. Also, the list should not include abbreviations that can also be used as words at the end of a sentence (e.g., "Ave." for "avenue").

The word radio button 145 provides that the input of a character that begins a new word is a binding event. The invention can identify this event by checking whether the immediately-preceding character in the text is white space (i.e., a space, tab, indent, new line, beginning of file, etc., and not another ink-printing character). So that numbers and symbols will cause a binding event, the beginning of a new word is defined loosely to include any group of ink-printing characters.

The Character radio button 146 provides that the input of any ink-printing character is a binding event. This is the least important of the text entry binding events for normal use of the invention, as it is very unlikely the user would be able to keep up with spoken text on a character-by-character basis. Some application for the character binding event may be found in cuing musical works with single-letter symbols, or where the sound of keyboard clatter is absolutely forbidden, or for handicapped users who have difficulty typing.

According to the preferred embodiment, only one of the paragraph to character radio buttons 143–146 can be set at a time. The choice determines the lowest order (most frequently happening) event that is to generate an audio link. Thus, if the user chooses the Word radio button 145, the invention will not generate audio links for keystrokes that would satisfy only the conditions for a character binding event. The invention will generate audio links for keystrokes that satisfy the conditions for a word binding event. Sometimes a keystroke will satisfy the conditions for both word and sentence binding events, and in some of those circumstances the same keystroke will additionally satisfy the conditions for a paragraph binding event. When a single keystroke satisfies the conditions for several binding events, only one audio link is created. Its type is the type of the highest order binding event for which the conditions were satisfied, the one that happens more rarely. For example, with the Word radio button 145 selected, the first keystroke of a new sentence in the middle of a paragraph will satisfy the conditions for the word and sentence binding events, but not the paragraph binding event. Thus, it would result in the creation of a sentence-type binding event.

Many variations of these binding events would still be very useful and would still be in harmony with the spirit and scope of the invention. For example, the methods used to detect paragraph and sentence breaks could be varied. The context sensitive methods could use the input stream for context rather than existing text to the left of the caret.

Also, where memory is plentiful, there is nothing wrong with linking every keystroke and determining what is really wanted later during playback. For example, taking this approach, linking every sentence would actually link all characters, but only the character links at the beginning of a sentence would be active for playback purposes. The user could change a user preferences to activate a different set of links.

2. Special keystroke 148: When this checkbox is checked, the pressing of a specified key is a binding event. This type of binding event is called an express binding event because the user expressly requested it. It creates an express audio link. The user can specify the special key (or key combination) in a selection box 150. Examples include function key "F2" or the combination "Shift+F2."

Thus, when recording and entering text, if the user can not enter text fast enough to keep pace with the presentation and starts to fall behind, the user can type the special keystroke to indicate that some important information is captured in the audio recording only. The user may also create an express audio link whenever he wants to return to a portion of the audio event. Then, upon play back, the user would rely mostly on express audio links to find the places to supplement his notes and use implicit audio links as a backup. By default, express audio links are always visible in the text edit area 62. The user can override the default and make them invisible by using the View menu 41.

When an express audio link is selected for replay, the computer will replay the recording starting at a few seconds prior to the occurrence of the binding event. (The number of seconds is set on the playback page. See FIG. 6C at 184.)

By setting the number of second to zero, the express audio link can be used to cue exact portions of the audio event. The user could use it, for example, to mark the exact moment a person starts saying particular words. Once the spot is marked or "cued," the words may be replayed at will from exactly the desired point. (If the user miscues the spot, a general Undo command in the Edit menu can remove the express audio link and the user can try again.)

According to the preferred embodiment, the special keystroke does not participate in the hierarchy for text entry audio links even if the character selected by the user in box 150 is a printable character. Thus, a special keystroke can result in the creation of two audio links that are adjacent in the current file.

3. Periodic 152: This type of binding event occurs only when the keyboard has been idle for the number of seconds 153 specified by the user. For example, a typical time may be 30 seconds. When the "Periodically" checkbox is checked, the invention periodically inserts an audio link at the then-current position of the caret in the text. Using the View menu, the user can make periodic audio links visible. When visible, they may be shown as some kind of symbol in the text. To avoid confusion with real text, a graphic or non-ASCII character is preferred, such as a unique kind and/or color of dot. A row of such dots would give a visual indication of keyboard idleness. The row of dots also acts as a handle for the user to quickly select any portion of the idle period in (for example) thirty-second increments. Thus, portions of the idle period can be selected for replay or selective deletion. The actual symbol used and its color could be made selectable by the user in one place that is applied to all user preference sets.

The periodic binding event is implemented by the invention setting a timer for the specified number of seconds 153. The timer is restarted with every keystroke. If and when the time expires, the binding event takes place, a periodic-type audio link is inserted into the text file at the caret, and the timer is restarted.

Periodic binding events interact with audio pruning options 130 as follows: If the audio is being discarded then periodic type audio links are also suppressed, since there is no audio to link to. However, if the saving of audio is resumed retroactively (see 136), then any corresponding periodic audio links that were suppressed will also be created retroactively. This is implemented by creating audio links as usual and discarding them only when the pruned audio is being discarded, after the appropriate time (see 136) has elapsed.

4. Lockstep. The "For every lockstep segment played" checkbox 156 controls whether lockstep play commands are a binding event. Because lockstep has its own page in the tabbed notebook 120, another lockstep checkbox 208 is found on that page. These two checkboxes control the same thing and the software keeps them in the same state. Thus, changing either changes both. Lockstep is explained with the explanation of FIG. 6D.

5. Sketches and Images. The "For sketches and images" checkbox 158 controls whether the drawing of sketches and loading of images generates audio links. According to the preferred embodiment, this feature links elements of a sketch or image with the recording. The elements of a sketch may include without limitation pencil lines, straight and curved lines, circles, rectangles, other geometric shapes, fill colors and patterns. As used herein, sketches refer to object-oriented drawings and images refer to bitmapped pictures or icons. The bitmaps may be black and white or color.

For object oriented sketches, the invention keeps a list of objects that collectively are the sketch. Each object retains its identity after it is drawn. When an object is added to the sketch, an audio link is created and associated with the object. (As a matter of implementation, the audio link may be a data member of the object). The object's identity as a discrete element of the drawing will be used when the user selects the element to access its audio link. The identity of each object is important so that it continues to behave like an object of its type whenever the user selects it to edit it. When an object is edited or moved, its audio link is not modified, nor is a new audio link created.

The object-oriented sketches can include smart shapes that have complex behaviors and can include multiple audio links. These are useful for commonly drawn diagrams and may include, for example, histograms, pie charts, number lines, 2D and 3D graphs, flow diagrams, and the like. An example of complex behavior and how it relates to the invention will be given for histograms. First, the user selects a histogram object from a template, menu or palette and deposits the histogram onto the text edit area 62. The invention creates an audio link for the histogram and causes the text to flow around the object to give it room. A typical histogram includes two axis and several bars originating along one axis and extending away from it for various distances parallel to the other axis. The user may at any time select the histogram and customize it in various ways. Matters of position, overall size, or design do not affect the audio links. These include, for example, such as orienting it vertically or horizontally, scaling the entire histogram to a new size, stretching the entire histogram horizontally or vertically, and so forth. Customization that incorporate data into the histogram do add audio links. These customization include, for example, adding an additional bar to the histogram, selecting an individual bar and adjusting its height, adding a text label to a bar or to an axis.

For bitmapped images, the invention creates an audio link when a bitmapped image is loaded into the current file. Bitmapped images are most suited for loading pre-existing bitmaps from disk and for capturing still pictures during a presentation using a digital camera. By selecting the bitmap, it can be edited as a bitmap to crop it or to correct its defects without generating additional audio links. Any mark drawn on the bitmap looses its identity (e.g., as a circle, line, rectangle, or text) if it is merged into the bitmap. According to the preferred embodiment of the invention, merged marks that have lost their identity do not create additional audio links. Optionally, the invention may be supplied with some example bitmaps ranging from small icons to larger pictures.

Bitmapped images and object-oriented sketches can coexist in the same file and even in the same drawing. For example, the user could use a digital camera to photograph a blackboard or a visual aid and load the resulting bitmap image into the current file. Then the user can overlay the bitmap with sketch objects to point out important parts of the sketch. The audio links generated include one for when the bitmap was captured and one for each object overlaid. The user can play back the audio by using a pointing device to select the bitmap or any overlaid object(s) and giving a play command.

Binding events in general. Generally, the binding events are implicit, meaning that they happen as a side effect of editing. The exceptions are the cue binding event and the special keystroke binding event. These are express (not implicit) binding events, because they happen only when the user expressly requests it by typing a special keystroke.

Using the View menu 41, the various types of audio links may be displayed i selectively according to their type. For example, a typical default display mode would be that express and periodic audio links would be displayed and text entry, lockstep and sketches/images audio links would not be displayed.

Unchecking a checkbox in the "Make Audio Link" group 140 does not delete the audio links already present in the currently open text file. Neither does checking a checkbox cause any immediate changes to the currently open text file.

Playback Page

Figure 6C:
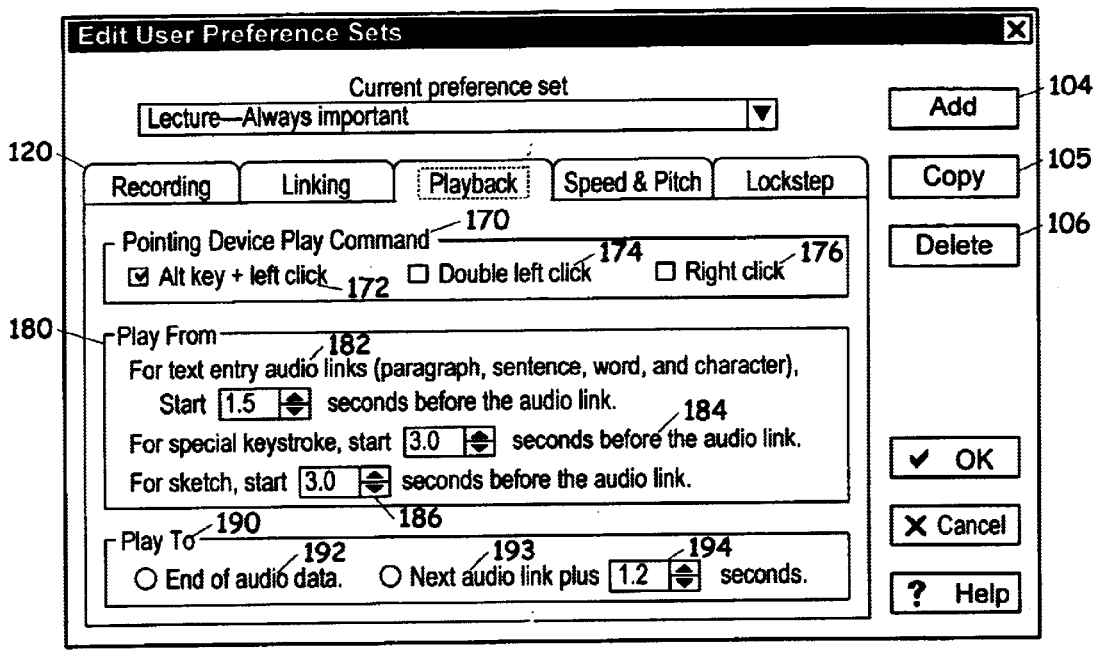

The Playback page is shown in FIG. 6C. It contains a "Pointing Device Play Command" group of controls 170 for enabling one or more ways a pointing device can be used to issue a play command. It also contains a "Play From" group 180 and a "Play To" group 190 for fine tuning where play begins and ends for most types of play commands. Lockstep is not on this page merely because it takes up enough space to warrant a page of its own (see FIG. 6E).

The invention provides for several ways to initiate playback of a portion of the audio recording. Some play commands start play from the invention's current position in the audio or audio/video. (This behavior applies only when no text or graphic objects are selected.) The current position is represented by the slider 51 on the track bar 50. Preferably, these are command that look like play command in other applications, such as the menu's 41 play command in the Audio menu, the audio button bar's 43 play button 70, and the shortcuts bar's 68 play command. Thus, to be user-friendly, the invention preferably tends to retain the familiar behaviors of familiar tools whenever possible.

The Pointing Device Play Command group 170 includes check boxes for three options. Users may activate or deactivate them as they wish, according to such concerns as which actions they find most logical, easy to adapt to and perform, and avoiding conflicts with other software that may be running concurrently. Any combination of zero to three options may be active at the same time. The default configuration is for only the "Alt key + left click" checkbox 172 to be checked. When the "Double left click" checkbox 174 is not checked, a double click selects a word under the pointing device cursor 63. If the "Right click" checkbox 176 is not checked, a right click displays a popup menu of available commands. The available commands are shortcuts for commonly-used word processing commands, drawing commands and other commands disclosed herein. Which commands appear depends on what the pointing device is pointing to. One of the commands should be "Play from audio link," which performs the same action as a right click when the "Right click" checkbox 176 is checked. This command would be enabled or disabled (grayed) depending on whether an audio link is nearby.

"I" /Arrow changes] Before issuing any of these commands, the user should position the pointing device to the place in the text edit area 62 that is of interest and that likely contains audio links to the corresponding portion of the audio. When the pointing device is over text, the pointing device cursor 63 has the appearance of an "I" beam or a vertical line. As is generally done in word processors, a pointing device click moves the caret to the position in the text pointed to by the pointing device cursor 63. If the pointing device is pointing to an image or a sketch, the invention changes the pointing device cursor 63 to an arrow and a pointing device click causes the invention to select the image or sketch, as is generally done in graphics programs. For the purpose of selection with a pointing device, explicit audio links (when visible) behave like a graphic object that can be selected. When the pointing device cursor 63 is pointing to an explicit audio link, it changes from an "I" beam to an arrow, or preferably to a special "audio link" cursor in recognition of its special nature and behavior. (For purposes of word wrap, the explicit audio links behave like characters, usually like an additional letter that is part of a word.)

The special audio link cursor is a mouse pointer that implies the pointing device is pointing to something that can be listened to. Many designs would be suitable, including a hand cursor with an outstretched index finger, as is commonly used by World Wide Web browser software to indicate the pointing device is hovering over a hyperlink. Preferable, it is such a hand cursor with a sketch of a human ear next to it.

When the "Alt key + left click" checkbox 172 is checked, the user may cause the invention to start playback by holding down the Alt key (e.g., on an IBM compatible keyboard) while pressing the left pointing device button. When the "Double left click" checkbox 174 is checked, two pointing device clicks in rapid succession will cause the invention to start playback. When the "Right click" checkbox 176 is checked, a click on the right pointing device button starts playback.

When the invention receives any of these play commands, it moves the caret only if the pointing device cursor 63 is positioned over text (i.e., in its I-beam state). If the pointing device cursor 63 is in its arrow state, one of these play commands will not leave the object in its selected state. Instead, it highlights the object momentarily to provide visual feedback of which object's audio link was used. (A normal left click would select the object.)

Also when the invention receives any of these play commands, it looks for an audio link. The type of audio link it looks for depends on what audio links are nearby and may also depend on the checkboxes checked in the "Make Audio Link" group 140 on the Linking page 120 (see FIG. 6B). If an explicit audio link was selected, the invention uses this audio link for the playback command. If a graphic object was selected, such as an image or an object in a sketch, the invention uses the associated audio link for the playback command. If the caret is in the text, the invention looks to see whether the paragraph, sentence, word or character radio button 143–146 is checked. The invention will look to the left of the caret for a text-entry type audio link that is of the same order or higher as the radio button 143–146 that is checked. The radio button 143–146 checked also determines how far the invention will look for such an audio link. If the "Paragraph" radio button 143 is active, it will look in the entire current file. If the "Sentence" radio button 144 is active, it will only look in the current paragraph. If the "Word" radio button 145 is active, it will only look in the current sentence. Due to the unique ways character audio links can be used, if the "Character" radio button 146 is active, it will look in the current line, as delimited by soft returns.

The user may use any of these three commands in a manner that selects several audio links for playback. This is done by left clicking and dragging with the Alt key down, by double left clicking and dragging, or by right clicking and dragging. Of course, for any of these to work, the appropriate checkbox has to be checked. (Double clicking and dragging is done in the following sequence: click, release, click, drag, release. The two clicks must be done in rapid succession and the drag can take as long as the user likes.) When multiple audio links are selected, the invention highlights the corresponding portion(s) of the track bar's 50 track 52 and starts playing the highlighted portions of the track 52 starting from the earliest-in-time audion link.

The normal behavior of the ordinary play commands, which start playback from the current position shown on the track bar 50, does not apply when text or graphic objects are selected. The selection referred to here can be accomplished using the ordinary word processor behaviors such as moving the caret with the keyboard while holding the shift key down, or left-clicking and dragging, or selecting a graphic object by left-clicking on it. Such selection is ordinarily used for such things as copying, cutting and pasting. The invention extends the options available to the user by causing any play commands received to search the selected material for audio links and to play these audio links.

The "Play From" group 180 is used to establish some optional minor adjustments to be made to the audio links before each time playback begins. Their action is self-explanatory from the figure. The times are expected to be positive. If an implementation of the invention allows negative times, they may be used to mean that playback begins after the audio link.

As shown by 182, only one time is given for all types of text entry audio links. This is sufficient because only one of them is active at a time. For consistency during playback, it is preferred that only one adjustment time 182 apply to all types of text entry audio links.

However, a user who wants to synchronize the text and audio only once a paragraph may be working with a different recognition time delay than a user who wants to synchronize once per sentence or word. If space allows, separate times should be given for each. Providing separate times for each saves the user the trouble of changing the time 182 when changing how often audio links are made 141 (FIG. 6B). In other words, for example, when Word 145 is selected in the Make Audio Link 140 group, the "play from" adjustment time for words should be used for word, sentence and paragraph audio links.

The "Play To" group 190 lets the user choose what ends-the playback that starts from an audio link. The default choice is that it plays until the "[e]nd of audio data" 192. Then it is up to the user to stop playback with a stop command (e.g., button73) or a pause command (e.g., button 71), or to issue another play command during playback. In the latter case, the invention instantly switches playback position, both with the audio being played back and the track bar 50. Usually, the user will hear a click as the audio content changes.

The Speed & Pitch Page

Figure 6D:
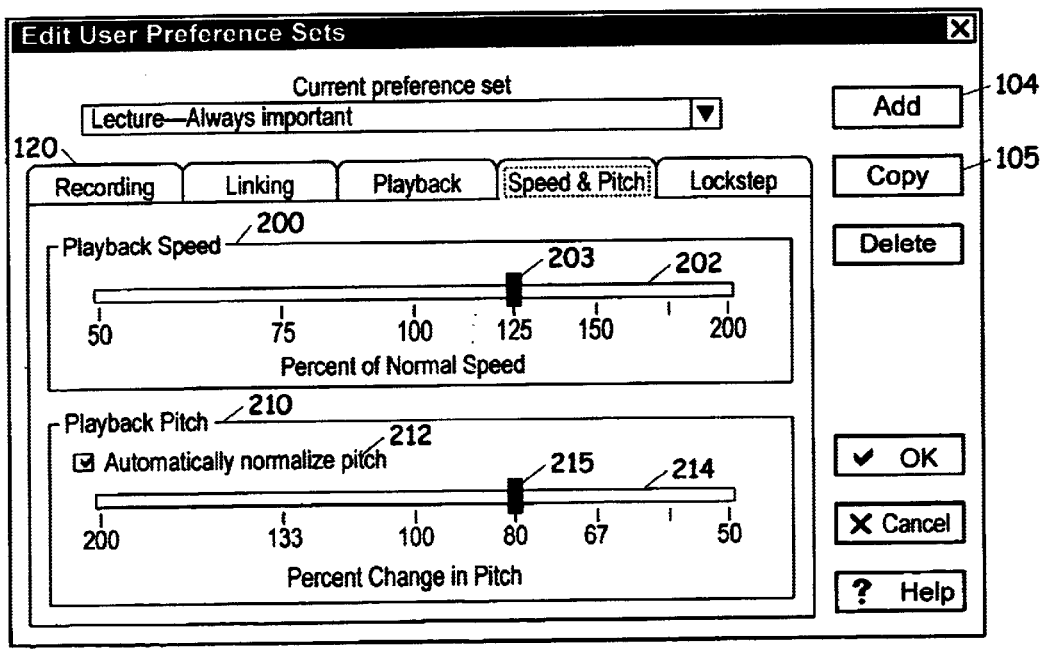

The "Speed & Pitch" page is shown in FIG. 6D. It provides essentially the same controls as are contained on the audio controls bar 42 of the main window 40 (FIG. 4). Thus, providing this page is optional in the user preferences. Its value is that it draws the user's attention to the speed and pitch features of the invention. It also shows the maximum and minimum values supported by a particular implementation of the invention. The "Automatically normalize pitch" checkbox 212 corresponds to the automatic pitch compensation checkbox of the audio controls bar. Either of these terms or another similar term may be used for this function. When this checkbox is 212 checked, sliding the Playback Speed slider 203 in the playback speed track 202 causes a corresponding movement in the playback pitch slider 215 in the playback pitch track 214. The values on this notebook page mirror those on the audio controls bar 42 so they are always the same.

The percent change in pitch is shown relative to voice pitch after applying the selected change in speed. Thus, a playback speed of 125% requires a compensating change in pitch to 80% . An alternative approach is to show percent change in pitch relative to the normal pitch and to always imply the compensating step. In this alternative approach, a playback speed setting of 125% would not change the perceived pitch and the user would need to change the pitch only to delibertly perceive a change in pitch. This may be desirable if the speaker has an unusually high or low voice. Thus, with pitch normalized by default, a pitch adjustment option is a less important part of the invention.

The Lockstep Page

Figure 6E:
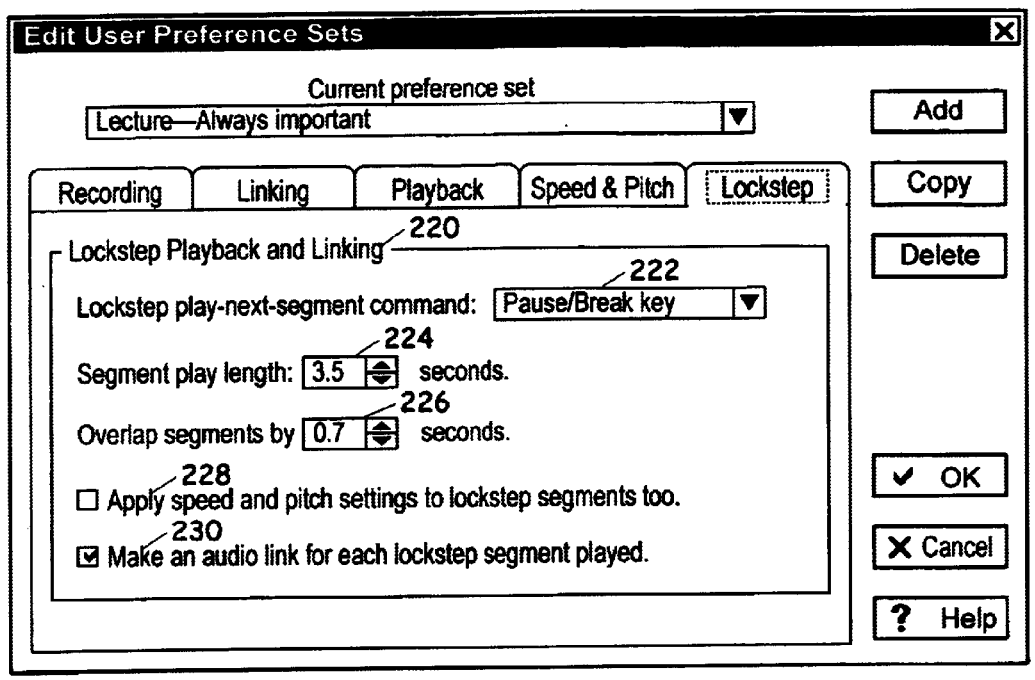

The "Lockstep" page is shown in FIG. 6E. It controls a useful playback feature of the invention that may optionally do some linking too. Briefly stated, lockstep playback can be used to play successive portions or segments of the recording, each segment being short enough for the user to act on it completely with only one listening, and to provide time between the successive segments for the user to act. Examples of the action taken may include transcribing words or summarizing or commenting on the recording, or choosing to do nothing with the lockstep segment.

Lockstep playback may be used whenever a recording is available for playback. The first step is for the user to move the invention to the position in the recording that the user wants to play back in one or more successive lockstep segments. Any of the features of the invention may be used for this including the various types of audio links, the track bar, other audio movement commands, and if there are any, previously created lockstep audio links.

The second step is to issue a play-next-segment command. This command is available in the Audio menu 41, by clicking the pointing device at 96 in the shortcuts bar 68, and at the keyboard. Usually, the keyboard will be the most convenient way to access the command. Because the playback of lockstep segments is followed by a pause, the "Pause" key provided on many keyboards is the preferred default key for the lockstep play-next-segment command. The user may change this default to another key by accessing the selection box 222 provided for this purpose.

When the invention receives a play-next-segment command, it plays back the recording for the segment length given in spin box 224 as a number of seconds. The user may change this number to any positive amount, preferably with a resolution of a tenth of a second or finer. The up and down spinner controls on the right side of the spin box 224 change the time in increments of a tenth of a second. A default segment length of 3.5 seconds is adequate. Preferably, the duration of play is extended by holding the key down for a time. When the key is released, then play continues for the segment length given. If the segment length is zero, the play continues only while the key is pressed.

Successive lockstep segment should normally overlap one another. This helps make sure all parts of the recording are intelligible in one segment or the next. A good default overlap is 0.7 seconds. A different amount of overlap can be set by the user in spin box 226. Overlapping is independent of segment length. Overlapping is more important for use with audio recordings than with video recordings. The user can obtain an greater overlap for a particular lockstep segment by issuing two or more lockstep play-next-segment commands in rapid succession. Each command moves back the position in the recording by up to 0.7 seconds (or whatever the user set in spin box 226). An easy way to implement this feature is for the invention to subtract the overlap time from the current position and move to the resulting position just before each lockstep segment is played.

Lockstep is a method of slowing down playback to provide time for users to type something between lockstep segments. Thus, when using lockstep playback, the user will probably prefer to hear the lockstep segments at their normal speed, rather than an accelerated speed used for other types of playback. This default behavior of the invention may be changed by checking the checkbox labeled "Apply speed and pitch settings to lockstep segments too" 230. (Alternatively, but preferred, lockstep playback may have its own speed and pitch settings.) If a lockstep segment is not played back at original speed, the playback and overlap times (in 224 and 226) are applied to the original speed. Thus, for example, a lockstep segment 3.5 seconds long, played at 200% speed, would require only 1.75 seconds to complete.

In FIG. 6E, the "Make an audio link for each lockstep segment played" checkbox 230 is identical in function and state to the lockstep checkbox 156 on the tabbed notebook 120 linking page (FIG. 6B). The function is duplicated for the user's convenience, since the user may be on either of these tabbed notebook 120 pages when making this and related changes.

Lockstep audio links are based on the assumption that the user will play a small segment of audio in lockstep mode and then make some notes about it (e.g., a few words of transcription). Thus, after a play lockstep command is given, the invention monitors what happens next, whether the user starts entering new text or seeks for a different part of the audio to play. If the user starts typing text, the first ink-printing character typed is audio-linked to the beginning of the lockstep segment most recently played. Before typing an ink-printing character, the user may change the position of the caret by using the keyboard or mouse. If prior to typing an ink-printing character the user does anything to play back or search for another portion of the recording, then the monitoring ends without that particular play lockstep command resulting in a lockstep audio link. Optionally, this monitoring may be shown by a change in the caret, such as adding a linked pair of chain links to the blinking vertical line.

The user can repeat the lockstep play and transcribe steps as little or as much as desired. When a substantial portion of text has been transcribed or summarized in this manner, the audio portions tend to be more tightly linked to the corresponding text than they were immediately after making the recording. Thus, if some transcribed text is selected for replay, the invention will look backward in the text and find the lockstep audio link that was created just before that text was transcribed, and will replay the same segment(s) used to transcribe the selected text. Because of this tighter linking or correspondence, any ambiguity as to whether a playback command refers to a lockstep audio link or a text entry audio link should be resolved in favor of the lockstep audio link. For consistency in playback behavior, the invention should search a little past the first text-entry audio link found to make sure there is no lockstep audio link lurking proximately behind it. The search ends at any ink-printing character, lockstep audio link, or the beginning of the file.

Lockstep audio links are useful for quickly finding your place after interrupting a transcription session and for replaying the audio a second time after the notes or transcription is complete. However, lockstep does not depend on the creation of lockstep audio links, as lockstep replay is very useful even when no lockstep audio links are created.

Replay of Audio

During replay of an audio-linked file, the user may wish to be notified when playback passes over an audio link. Such notification can be accomplished by an Audio Link Transient Highlighting feature that may be provided with some implementations of the invention. When this optional feature is available and enabled, as the recording plays, the visible audio link or text linked to the portion of the recording being played is momentarily highlighted as the corresponding audio portion is being played. The highlighting can be accomplished with color, reverse color, underscore or bold type. This creates a visual display that shows where in the text the typist was when making the audio links for each part of the audio recording.

This feature may be activated through the View menu, using a menu item such as "Highlight text when played." When enabled, a checkmark appears to the left of the menu item name. This feature should also highlight images and objects in sketches when they are played. Although optional, the Audio Link Transient Highlight feature is part of the preferred embodiment of the invention.

Noise Reduction

An optional feature of the invention, one that may be provided for the most complete implementations at a higher cost, would include noise reduction by processing the waveform before it is recorded and/or just before the recorded audio is played back. The user should be able to switch the noise reduction features on and off at will, and also adjust them where possible.

This processing may include analog and/or digital filters to remove frequency components that are outside of the vocal range. Such devices and methods are well known in the prior art and need not be described further herein. They may be included for their advangages, but they also have disadvantages too. The disadvantages include the fact that they can not distinguish the voices that are of interest from noise of vocal frequencies, such as humming, ringing or beeping of machines and equipment.

A new method of processing the waveform will now be disclosed. This method may be used with or instead of ordinary filtering. One goal of this method is to remove background noise that includes a periodic waveform of any complexity.

According to this method, the loudness of the incoming audio signal is continually monitored in search of the most quiet portions of the audio waveform. As quiet portions are identified, they are checked for the presence of periodic waveforms that are present in two or more quiet portions, or one extended quiet portion. The loudness may be measured as peak waveforms or RMS or any other measure of loudness, it does not matter.

A periodic waveform that is present in several quiet portions is assumed to be present in the non-quiet portions between them, and with less certainty, possibly after and even before them. When a periodic noise waveform is identified in two quiet portions, the phase of the two periodic noise waveforms are compared to see if an integral number of cycles can be interpolated between them to "connect" them. If they can be connected, the periodic noise waveform is arithmatically negated and interpolated over the non-quiet portions of the incoming waveform. The two waveforms are then added to each other to produce an output waveform. This output waveform does not include the periodic noise component, because it was subtracted out. There are other algebraic manipulations that lead to the same interpolation and subtraction result.

The waveform does not have to be a sine wave. It can be any complex waveform so long as it repeats itself.

The minimum duration of a portion of the waveform that is of interest depends on the desired noise to be removed. The duration should be at least as long as one complete cycle of the sound to be removed. Thus, to remove 60 Hz hum (from AC power lines, for example) the quiet portions should have a minimum duration of ¹⁄₆₀ of a second. A high pitched whine benefits from a shorter duration. There are several reasons for this. Shorter quiet moments are more plentiful than long quiet moments. The shorter period of the periodic noise waveform requires more accurate phase matching for proper interpolation. Also, high frequencies can contain the same sound energy in smaller peaks and valleys than loud signals. Thus, the invention should be sensitive to high frequencies for short durations, middle durations for middle frequencies and require longer durations for low frequencies. All frequencies and durations can be monitored simultaineously.

When the invention encounters portions that are more quiet than the previous portions that have been used to subtract out noise, it means either that the noise is over or it wasn't noise. The former is more likely when the sound was found and matched up in two quiet portions.

Extrapolation is possible when the periodic noise signal has been detected in enough quiet momemts to conclude that it is always present.

The source of the incoming audio signal may be the microphone or a recorded waveform file, or any other source of sound data. This microphone or other source of sound data may come from a device that is directly connected to the computing device with a cable, or by radio, or modulated microwave or optical signals (e.g., infrared), or by a virtual connection such as TCP/IP.

Voice Recognition

The current invention can be made more useful by integrating it with automatice voice-to-text transcription capability. Such transcription may take place after the audio event is over. Thus, the invention does not require real-time voice-to-text transcription capability.

Any technology known to the prior art is sufficient, but the method disclosed in U.S. Pat. No. 5,640,490 to Hansen et al (incorporated herein by reference), is particularly suitable. This patent also discloses special hardware necessary (at the time of filing) to make it work in real-time. The preferred method for the current invention would probably implement a software-only method, unless equivalent hardware becomes very inexpensive or common-place.

The method used in the current invention would also differ in that as frequency components are identified, they are subtracted out of the input waveform much like the noise-reduction method disclosed above. This simplifies the waveform so other sounds and/or the voice of a second speaker can be found. Even if the subtraction is not perfect, it will attenuate a component of the sound that can interfere with further and more detailed analysis.

Implementation Details

Multimedia Support

The invention can use whatever multimedia support the underlying computer system (hardware and OS) makes available. For example, the invention can be implemented most easily by utilizing existing support for recording audio and/or video, playing audio and/or video, determining the current position in the audio and/or video stream while recording, and setting the current position from which to start playing. Determining the current position while playing is less important to the invention, but it is also useful for the "linking while playing" function.

Of course, it is also possible to bypass OS-provided multimedia functions and control the hardware directly. This could include custom hardware. It could also include custom device drivers that communicate with standard or custom hardware, perhaps at a higher priveledge level than application programs. However, the preferred embodiment is to use standard hardware and software support.

The hardware and software support is not critical. For example, Microsoft has provided several types of support for controlling the multimedia capabilities of a computer that is running on the various versions of Windows. Direct X provides the finest control (eg. Direct Sound). This was demanded by game developers because, for example, the exact moment a crashing sound is played must coincide with the exact moment two objects collide on the screen. Without Direct X, delays of a few hundred milliseconds gave unnatural results. However, no such requirement exists for the current invention. Delays of a few hundred milliseconds are tolerated quite well. This is true even for express cue events, because cuing within a few hundred milliseconds is still quite useful.

Speed and Pitch

The speed and pitch features of the invention are implemented according to methods well-known in the prior art. Microsoft Windows directly supports changes in playback rate in their low-level mulitimedia functions. Also, the Variable Speech Control Company is assignee to several U.S. patents covering the changing of playback speed without changing pitch. These patents are hereby included by reference.

Implementation of Word Processor

The invention can be implemented in several ways. For example, an existing word processor, text editor, memo component or the like can be used to perform the word processing portion of the invention. This can be done by adding the data structures and methods of the invention to the word processor's data structure and methods. Most likely, this should be done by the publisher of the existing word processor. If the existing word processor can be modified or has hooks provided for future modifications, the invention can use these. If the word processor provides hidden text, hidden comments, annotations or user-defined embedded codes, the invention's data can be stored in one of these and the invention can run "on top of" the unmodified or slightly modified word processor.

One way of providing hidden text is to modify the definition of a font so some characters do not print and have a width of zero, and to catch and preprocess keyboard and pointing device events. The preprocessors for these events would detect these hidden characters and treat them as if they were all one item along with a single normal character. This means cursor key movements would skip over them and pointing device clicks could not relocate the caret between any two of them. Play command event handlers would interpret them as audio links. The included Delphi program operates this way. This method has the advantage of being the simplest to implement.

However, the preferred way to implement the invention is to prepare a custom word processor to perform both the text editing portion of the invention and also to store audio links with the text. Using a custom word processor may require a greater initial investment, but it assures the word processor can always be modified as desired for both current and future versions of the word processor and of the invention, without having to rely on some other party. The decision of whether to use an existing word processor or a custom word processor is not important to the invention and would be directed by the resources of the entity that will make the invention and the needs of the target users of the invention. It is likely that each entity that implements the invention will have its own favored way of implementing it, either from scratch or by integrating it into an existing hardware and/or software product. The invention is flexible enough to accommodate any platform that provides at least a minimum control over some audio and/or video input and output.

Implementation of Event Handling

Figure 7:
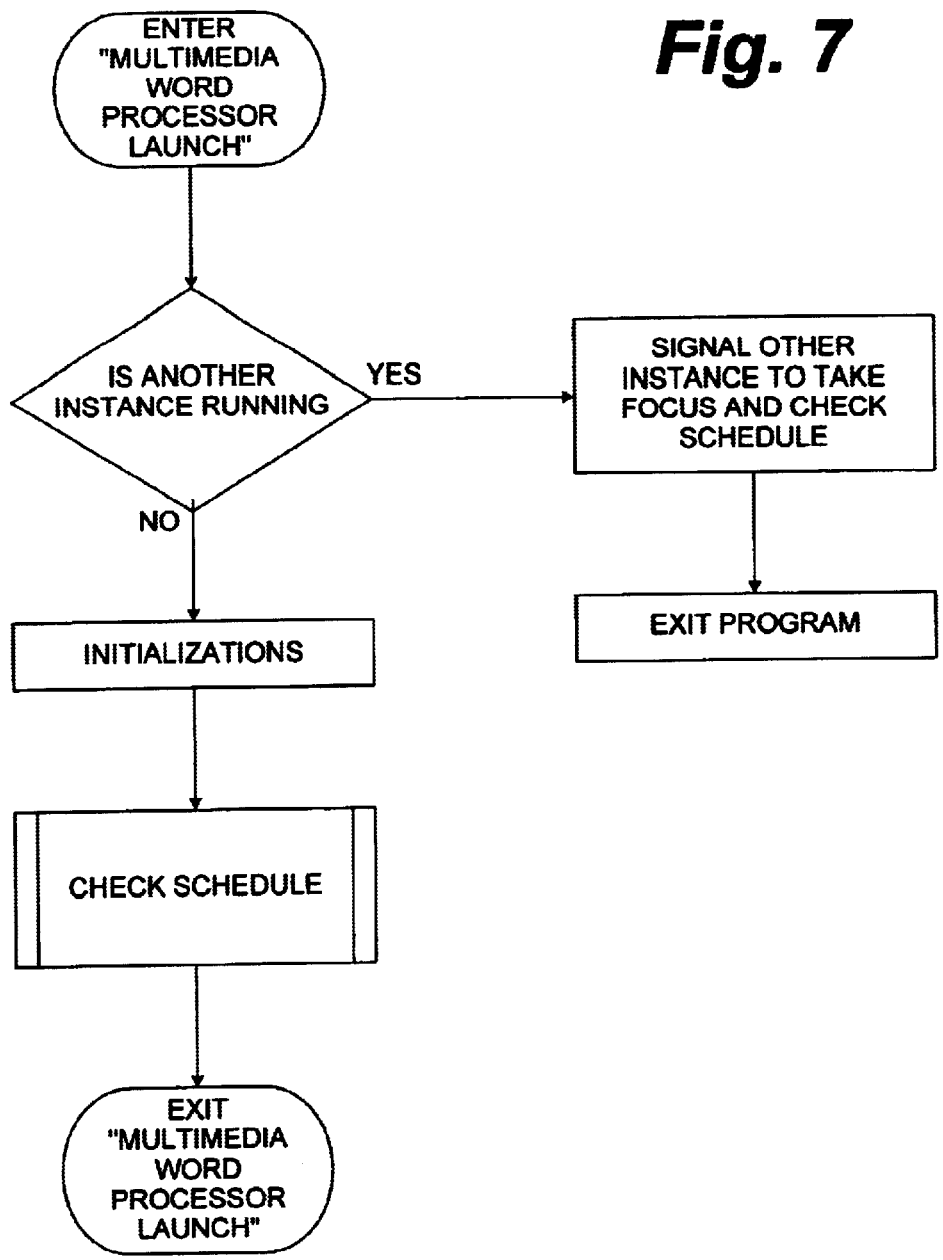
FIGS. 7–9, 10A, 10B, and 11–18 are flowcharts showing the details of the invention.

FIG. 7 shows the launch steps of the multimedia word processor program. An early step is to check to see if another instance of the program is already running. If not, it performs normal initializations typical of all programs during launch. Then it checks a list or database of scheduled events to see if there is currently a scheduled event taking place that needs to be recorded. It does this by performing the "check schedule" procedure, which is capable of taking the necessary actions for whatever it finds.

On the other hand, if there is another instance of the program already running, then the launching instance signals the other instance to take the focus and the launching instance exits. When the other instance gets a signal to take the focus, it will show itself on the display. Then it also performs the "check schedule" procedure. The consequences of this arrangement is that if a scheduling daemon discovers that the invention should be recording an event, it just has to launch the multimedia word processor program without first checking to see if the program is already running. The newly launched or already running instance will then also discover that a scheduled event needs to be recorded.

Figure 8:
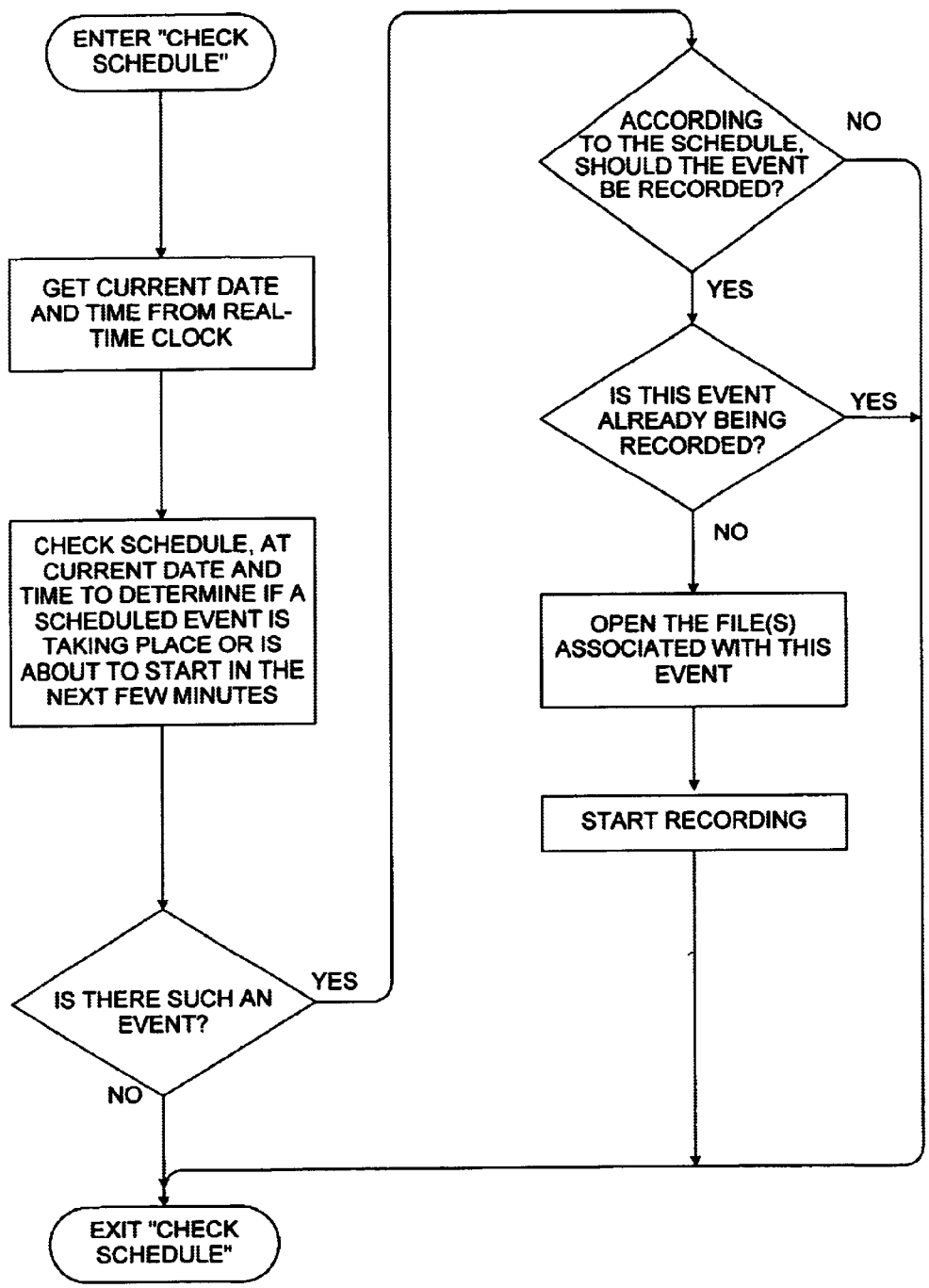

FIG. 8 shows the details of the "check schedule" procedure. It obtains the current date and time from the computing device's real-time clock. (This assumes it has a real time clock. If it does not, then it is very difficult or impossible to implement the scheduling feature of the invention, which is an optional feature anyway.) It then looks up the current date and time in a list of scheduled events to see if there is a scheduled event happening now, or one that is about to start in a few minutes.

This list of scheduled events is prepared previously by the user. It may be something like a schedule of classes for several university courses. At the beginning of a semester, the student just enters in the class name and when it meets each week. Then there should be some way to enter exceptions to the weekly schedule at any time the student becomes aware of them.

If the invention determines no such scheduled event is exists, it exits the "check shedule" procedure. If it does find such a scheduled event, it then checks to see if it should be recorded. This is because the user may want to include other events that do not need to be recorded in a daily planner type of program that communicates with the current invention. If the invention finds that the event should be recorded, it checks to make sure that it is not already being recorded. If it in not already being recorded, then it opens the file(s) that were associated with this type of scheduled event and starts recording.

This step of checking to see if it is already being recorded should be performed with mutual exclusion to avoid race conditions with other processes that might at that moment either be starting to record or checking whether recording has already begun.

Figure 9:
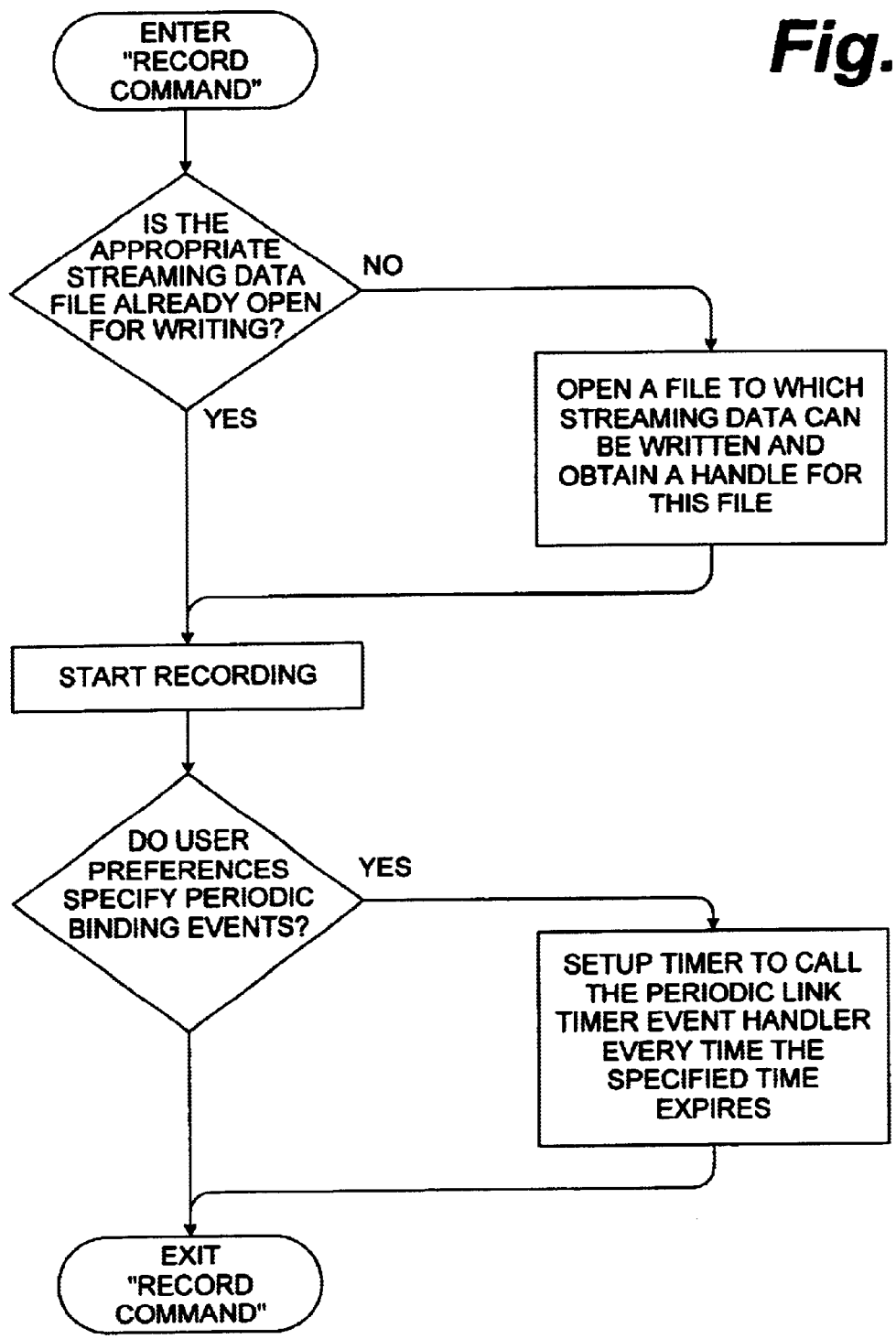

FIG. 9 shows the details of the "Record Command" procedure. A step that might be useful but that is not shown, is before the invention initiates recording, to check for any unrelated open audio file that may need to be protected by saving them to permanent storage and closing them. The reason this is not shown is because it is unlikely that a user would get to this point without having closed other files already, and also because there is nothing intrinsically wrong with having several files open, if the hardware supports it.

The invention can choose a unique name for the audio file it is about to create, or it can open one that is given to it by the schedule of events, or it can leave the file unnamed. Some operating environments do not require a name at this stage, or perhaps any stage, so this naming step can be postponed until the name is needed.

The first step that is shown is to check to see if the appropriate file is already opened for output. This may be the case when the recording has been paused for some reason. If the file is not yet opened, the invention opens it for output or writing. With audio files, the terms "input" and "output" refer to the file system as seen from the computer's point of view, and not the computer's interactions with a microphone or speaker. Thus, during recording, audio data is "output" to a file.

This open step may mean vastly different things on different computing devices on which the invention is implemented. On a PDA with no disk, it may mean allocating memory to receive and store the streaming multimedia data. On a notebook it may mean opening a disk file for writing. It may also mean opening a high level "stream" component such as the TMemoryStream available in INPRISE's DELPHI programming language. It may mean allocating some buffers in RAM and opening a file on secondary storage and spawning processes to move the data in a timely fashion. It may mean opening a memory-mapped file, one in which the entire file appears to be in memory but it is really just a virtual image of a file which really exists on a disk. None of these implementation decisions make much difference to the current invention except that there is some advantage in some uses of the invention to minimize the power consumption of a disk drive.

With the new audio file opened for output, the next step is to initiate recording. If this step was successful, a mode flag is set to "record and link" to communicate to the rest of the invention that these functions are in progress. Of course, if an error occurred, it is reported to the user and the mode flag is not set to "record and link." To keep the flowcharts uncluttered and understandable, routine processing of error conditions is not always shown.

The next step is to determine if the invention should be making periodic links. This is done by checking the user preferences in effect. If so, then a timer is set up to call the periodic link timer event hander every so often, also according to the user preferences.

During the recording of the audio event and inputting of ink-printing data, the invention will establish audio links between the audio recording and the ink-printing data. No particular method of establishing audio links is required for the invention. In other words, there is great latitude in determining when audio links are to be established. Nevertheless, some are preferred more than others.

Figure 10A:
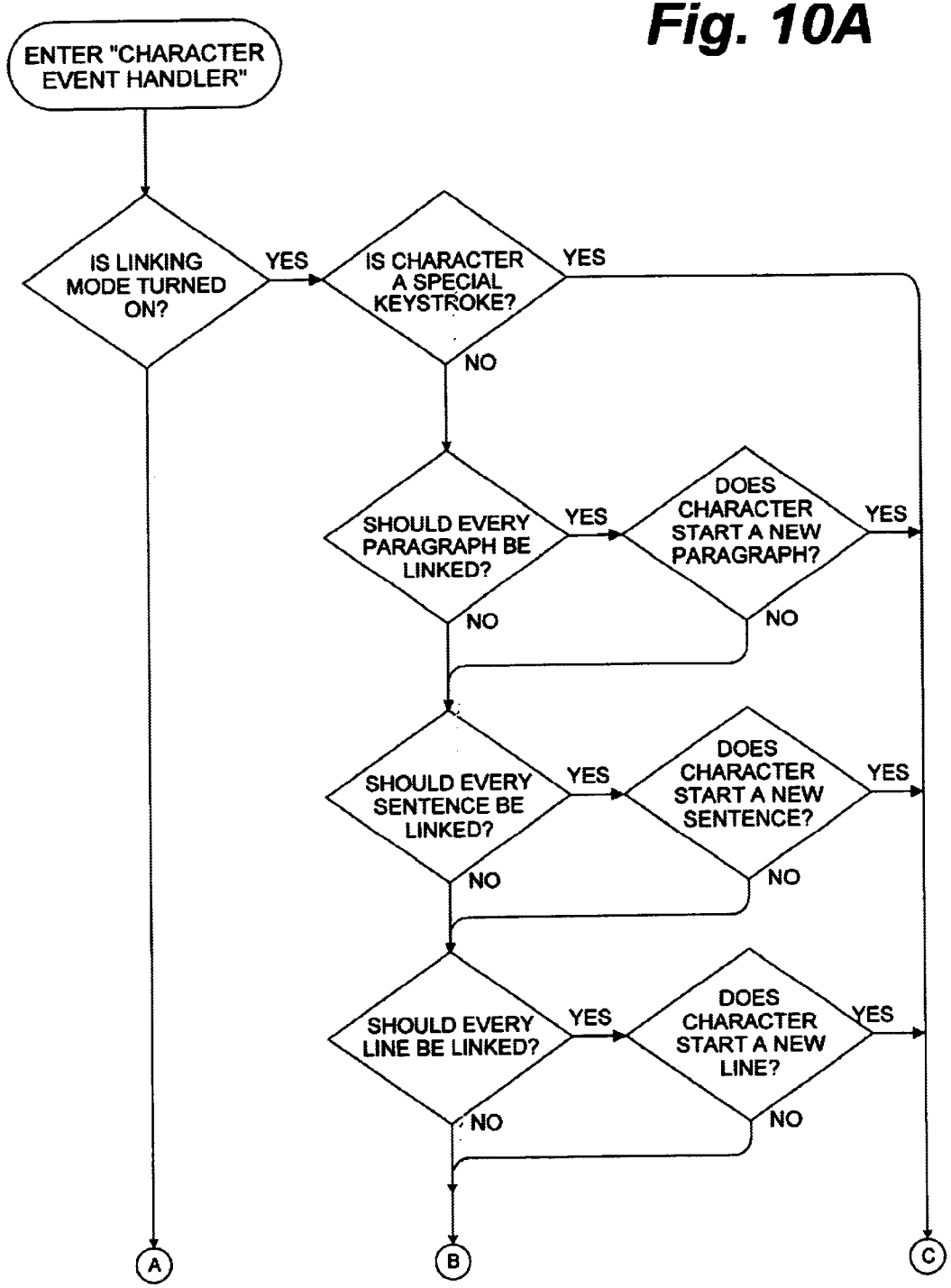
Figure 10B:
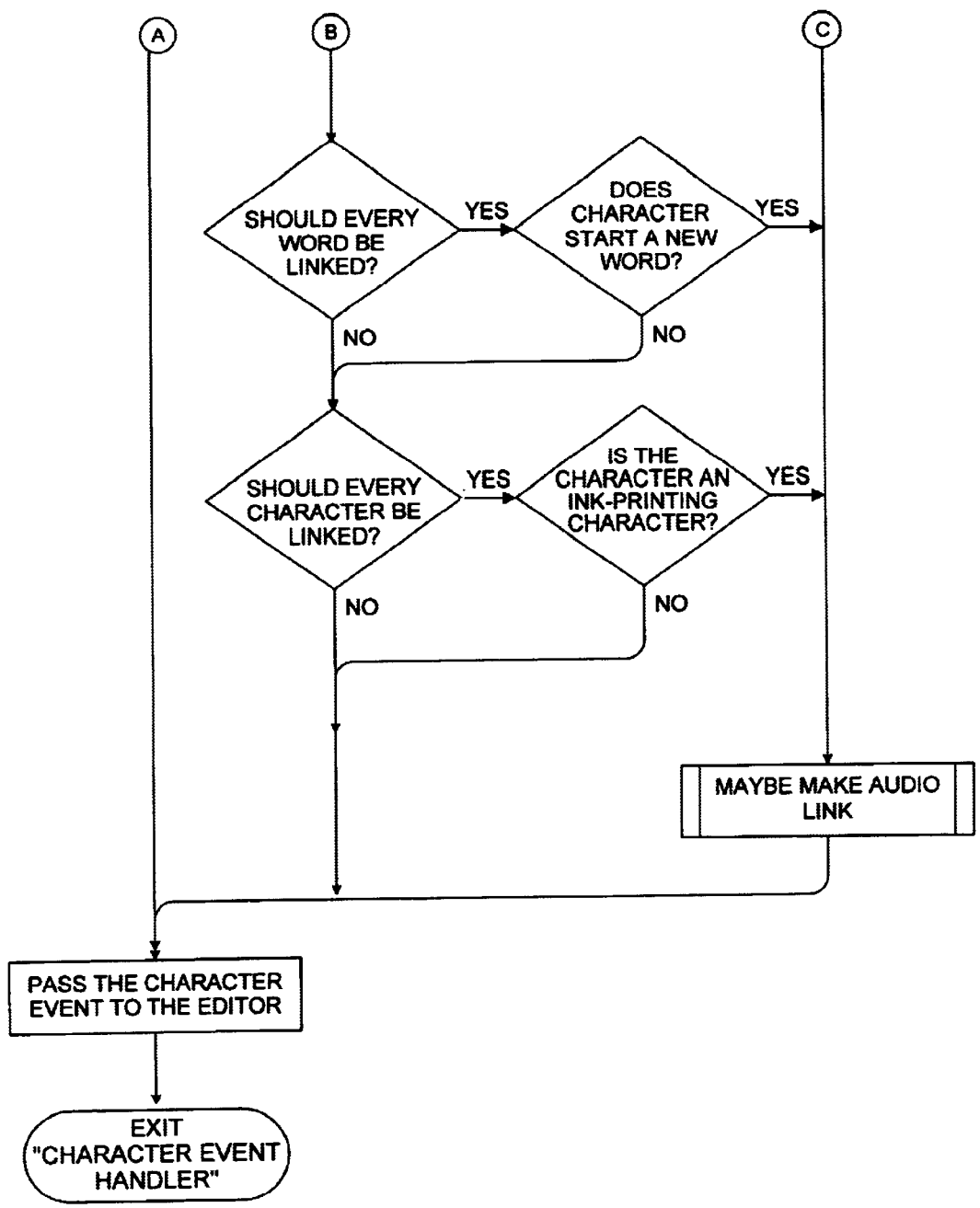

FIGS. 10A and 10B represent the details of the "Character Event Handler" procedure. This processes keyboard events such as keystrokes. It also processes character input from the character-recognition engine in pen computers. The main issue to be resolved here is whether the character event is also a binding event. If so, the subroutine "Maybe Make Audio Link" is called. In either case, the keyboard event is passed on to the text editor. (The invention may also provide in the user preferences that keyboard events associated with a particular key are processed here as binding events and swallowed, that is, not passed on to the editor. This makes it impossible to send that keystroke to the editor. This variation is not shown in the figures.)

A "binding event" is not in the same category of events like keyboard or mouse events. Nor are any of these events to be confused with an "audio event," "multimedia event," "real-time event," or "scheduled event," all of which mean the same thing and can be thought of as a one-hour lecture. A binding event is a creation of the invention. Generally, programming environments such as INPRISE'S DELPHI or C++ BUILDER automatically implement an event loop that preprocesses raw keyboard, mouse, timer and many other system events. This event loop sends these events to the appropriate event hander routine. This event loop can also be implemented manually, if a developer is inclined to do so. The various events processed in the program's event loop, may create circumstances and conditions (e.g., a space followed by a printing character) that, with reference to the user preference set currently in effect, justify the conclusion that a binding event has taken place.

These binding events are detected by examining the character that caused the character event and the text near the carat, which is the current insertion point of the next character. Usually the text to the left of the caret is most useful. The details of these steps have been described above.

Figure 11:
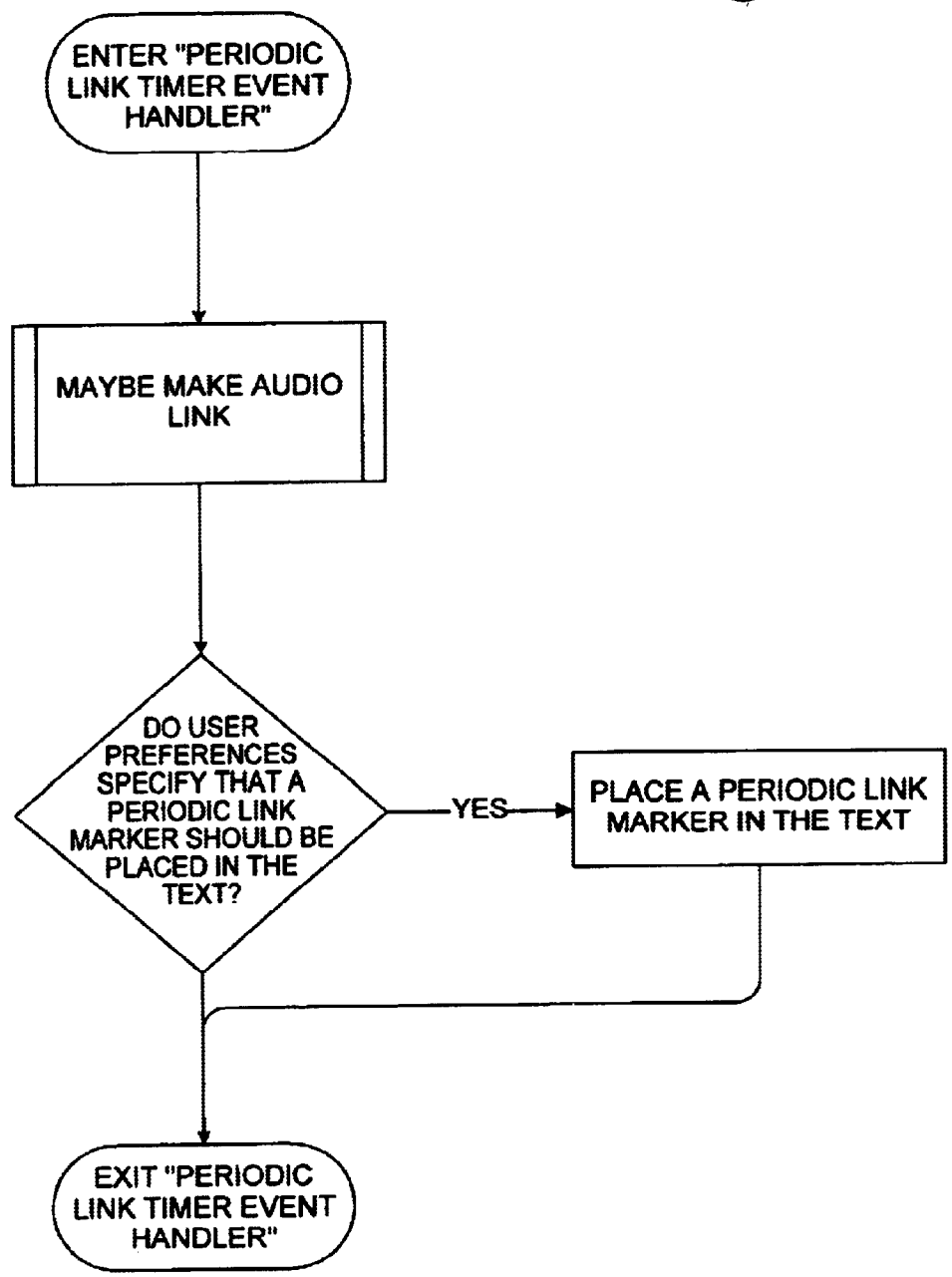

FIG. 11 shows the "Periodic Link Timer Event Handler" procedure. If this event occurrs, it means that it is wanted because the timer is turned on and off along with recording being turned on and off (or being paused), if the user preferences so dictate. Thus, the main step is to call the "Maybe Make Audio Link" procedure. Either before or after that call, the invention checks to see if it should insert a marker of some sort into the word processor file.

Structure of Audio Links

FIG. 5A shows one format that the text and audio link data can take in memory and saved as a file. Audio links are enclosed in brackets. The large numbers represent time in milliseconds since the beginning of the audio file. Audio links do not need to be so precise. Storing the number of seconds since the beginning of the audio file is good enough for most uses of the invention. The text not enclosed in brackets are key words that were typed during a forum.

According to the preferred embodiments, audio links are implemented in two parts: global and local. The global part is a file record that associates a unique index number and the pathname of the audio file. This means the relatively large pathname does not have to be included with every audio link in the text file. In FIG. 5A, the first bracketed item of data is a file record (indicated by the "W" for "wave file"). The number after the "W" is the index number. The text enclosed between the equal sign and the close bracket is the audio file's pathname. The index number is sufficient to uniquely identify the file. One time the file record can be created when the file is opened for output. However, this is not necessary as sometimes several audio files can be referenced in one word processing document.

The local part is what is referred to as the audio link. Audio links contain records including the type of binding event that created the audio link, the file index number, and some position information to fix a point within the file. FIG. 5A shows numerous audio links enclosed in brackets. The "A" identifies the record as an audio link. The next character indicates the type of audio link. The number indicates the file index number. The "@" separates the file index number from the position information, which comes last. The position information can take several forms such as time (e.g., milliseconds is shown) or samples. Other forms, such as address in RAM or on disk, are possible but not as convenient.

FIG. 5B shows another format that the text and audio link data can take in memory and saved as a file. In this case, it is an enhanced form of HTML (hypertext markup language), in which the position to start playing an audio file can be indicated by a pound sign ('#').

Figure 12:
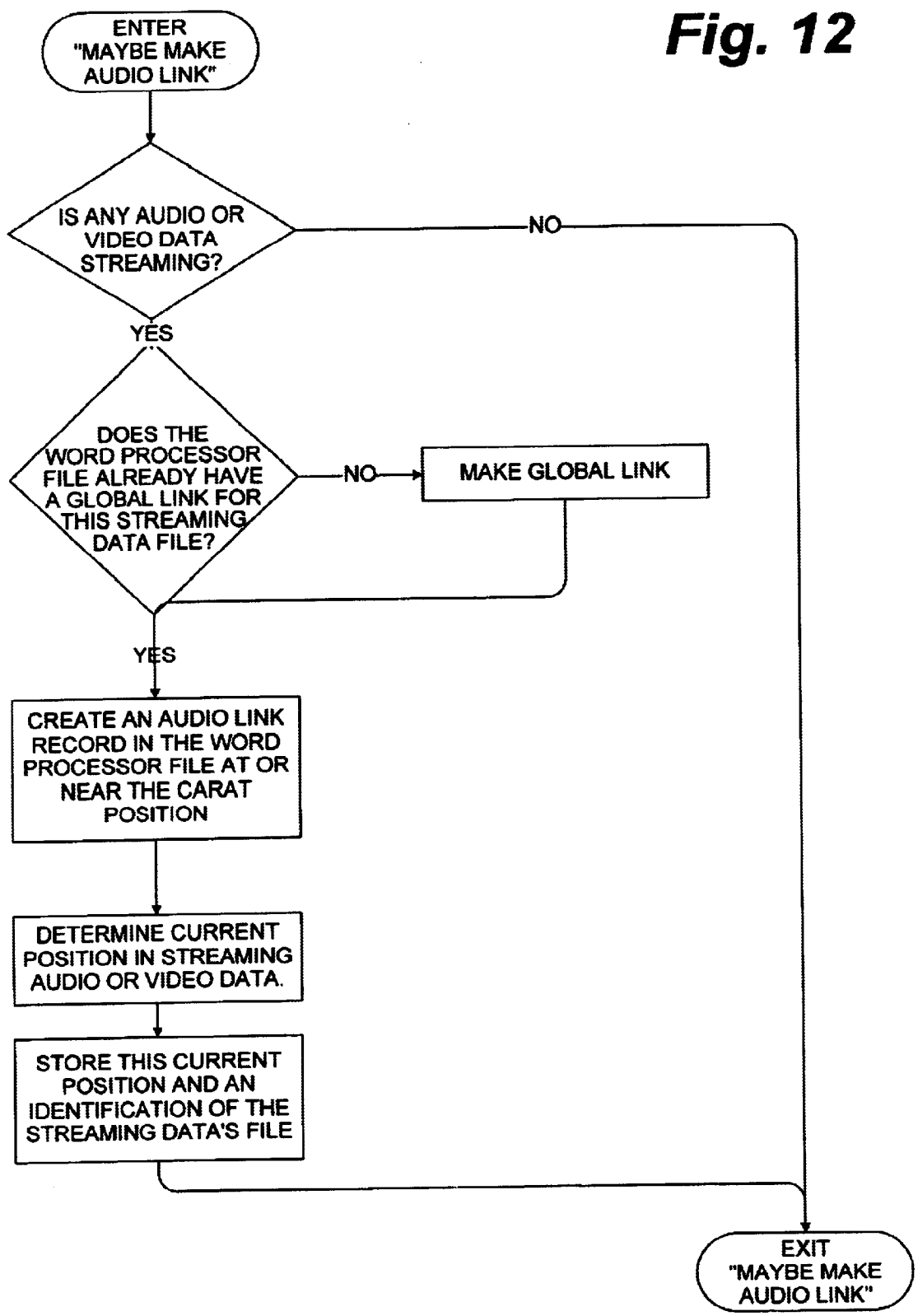

FIG. 12 shows the details of the "Maybe Make Audio Link" procedure. The first step is to determine whether there is any data streaming in or out of the computing system. If no, the procedure exits. If yes, the invention makes a quick check to make sure that the word processing file has a global audio link, one that specifies where the audio data is stored. If not, it prepares a global link. This is really optional because every link could just as well indicate the data source in addition to the position within the data, but the former global link method is currently preferred to save memory. Another reason it is optional is that it might be obvious in case there is only one "file," such as in a PDA that relies solely on RAM.

The "Maybe Make Audio Link" procedure then continues by actually making the link. The preferred way of doing this is to insert the link data into the word processor file at the point of the link. The program also obtains the position of the data that is streaming at that point in time and stores this position as part of the link. Thus, as described elsewhere, the link data usually includes such information as the identifying index number of the currently open audio file and the current position within the audio file.

Implementation of Audio Link Transient Highlighting

Audio links are usually used by the computer to find its way from a particular point in the text to a particular point in the recording. However, there are situations when the computer may need to find its way from a particular place in the recording to a particular place in the text. One such situation arises with the Audio Link Transient Highlighting feature that some implementations of the invention may provide. This feature-momentarily causes a visible change in the text to inform the user that the position in the recording being played just moved over another audio link. If the audio link is visible, such as for express audio links, the momentary change applies to the visible audio link itself. If the audio link is not visible, the change applies to the appropriate character, word, sentence, paragraph, bitmap image or sketch element, depending on the type of audio link passed over. For lockstep audio links, the appropriate portion to highlight is at most a few words after the audio link and before the next lockstep audio link, if any.

The preferred method of implementing access from audio position to text position is to provide a cross reference table. This table is built for each audio file when it is opened for input the first time (or for all audio files when the text file is opened). The table is built by examining the text file for audio links and making a list of audio links sorted by time or position in the audio file. The entries in the list would include pointers pointing to the audio link in the text file. Having made this list, it becomes a simple matter to find the entries in the list that most closely correspond to a given position in the audio file, and to follow the pointers to the audio links in the text file. The text pointers should point to the correct place even when the text is edited. This is not difficult, since the text file can always be searched for an audio link that was found in the cross reference table. If the audio link is deleted then the cross reference entry should be deleted also.

Mouse Movement and Cursor Changes

Figure 13:
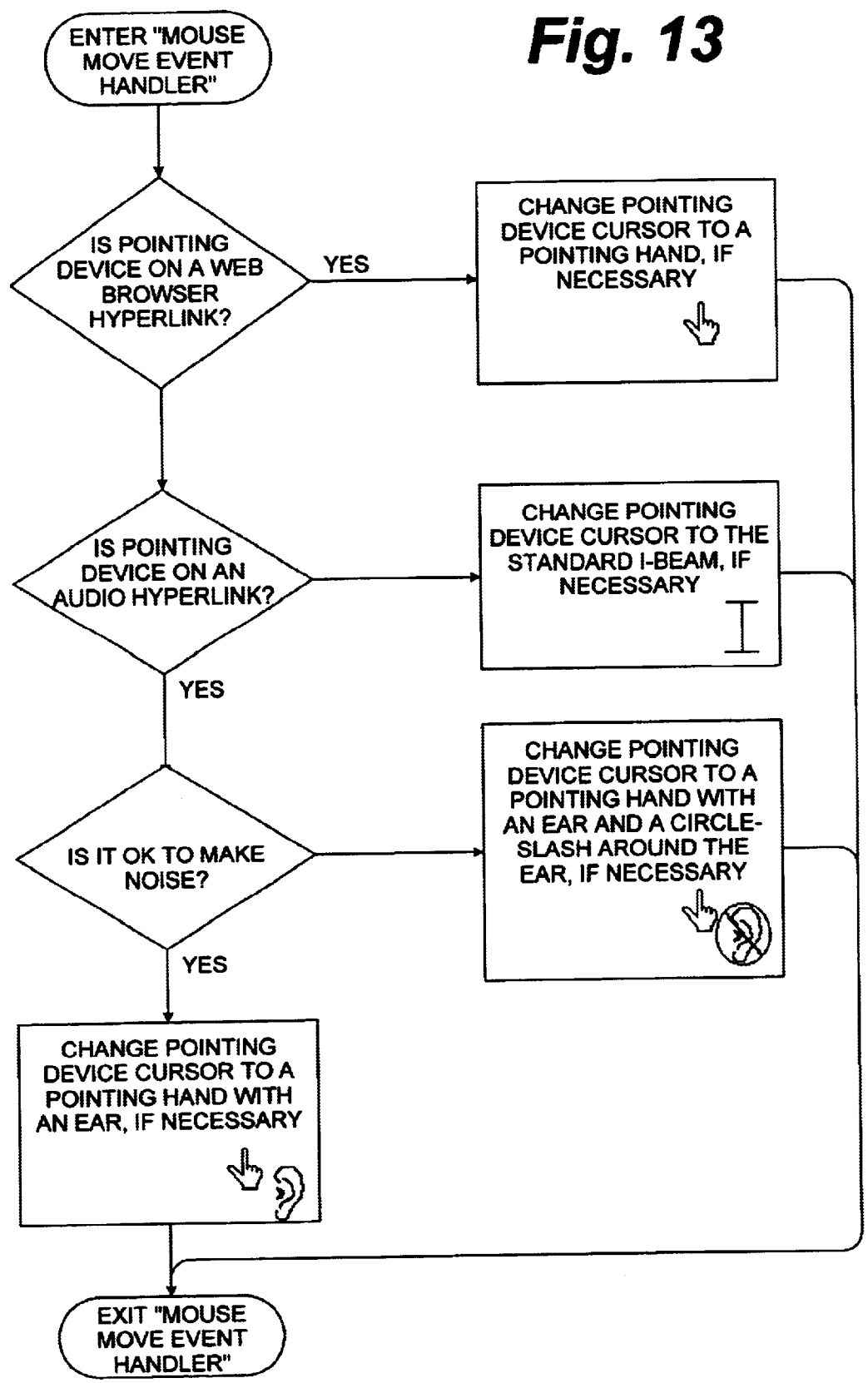

FIG. 13 shows the "Mouse Move Event Handler" procedure, which is called by the system every time the pointing device coordinates change. The new position of the cursor is available to the procedure. The invention determines whether the cursor is over any of the objects indicated in the drawing and if so changes the cursor to the indicated cursor. Enlarged representations of these cursors are shown in the flowchart. They look bitmapped because they are bitmapped.

The cursor changes are done only "if necessary." This means that if the cursor is already the desired cursor, no change is made. In some computers that do not check for this condition on their own, this test will improve system performance and reduce cursor flicker. The question "is it okay to make noise" is the same as "is it okay to break silence."

Mouse Clicks

Figure 14:
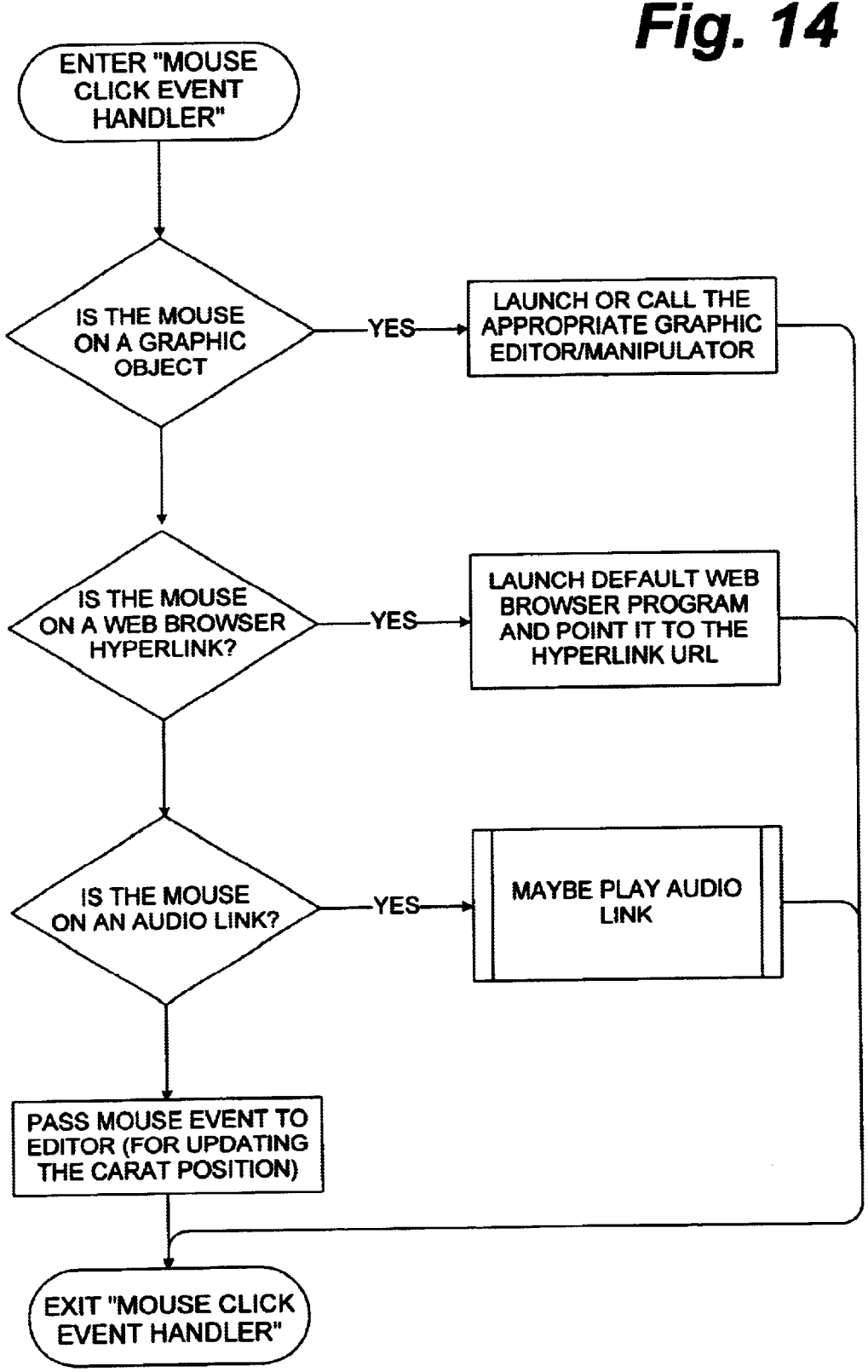

FIG. 14 shows the details if the "Mouse Click Event Handler," which is called by the system for all mouse click events. If the mouse is on an audio link, the invention calls the "Maybe Play Audio Link" procedure. If the mouse click was on ordinary text the event is passed on to the editor so that it can, for example, update the position of the caret. It is not necessary to update the position of the caret for the other types of clicks.

Implementation of Initiating Playback

The main issue to be resolved is whether to initiate playing the audio because of the pointing device event. This issue is controlled by the active user preference set. The active user preference set determines the circumstances under which to initiate play of the audio. The circumstances initiating replay include that play is enabled for the type of movement made and that the pointing device event selected an audio link for replay The possibilities include, for example:

1. Movement of the caret to a word that is adjacent to an audio link of a certain type, such as one bound to the beginning of a new word.
2. Movement of the caret to a sentence that has included an audio link bound at the beginning of the sentence.
3. Movement of the caret to an express audio link.
4. Movement of the caret to a periodic audio link.
5. Clicking on a visible audio link with the pointing device. This is the most preferred method of initiating playback.

Other such possibilities can mirror the types of binding events, or depart from them. If a new audio link is selected, the "Maybe Play Audio Link" subroutine is called.

Figure 15:
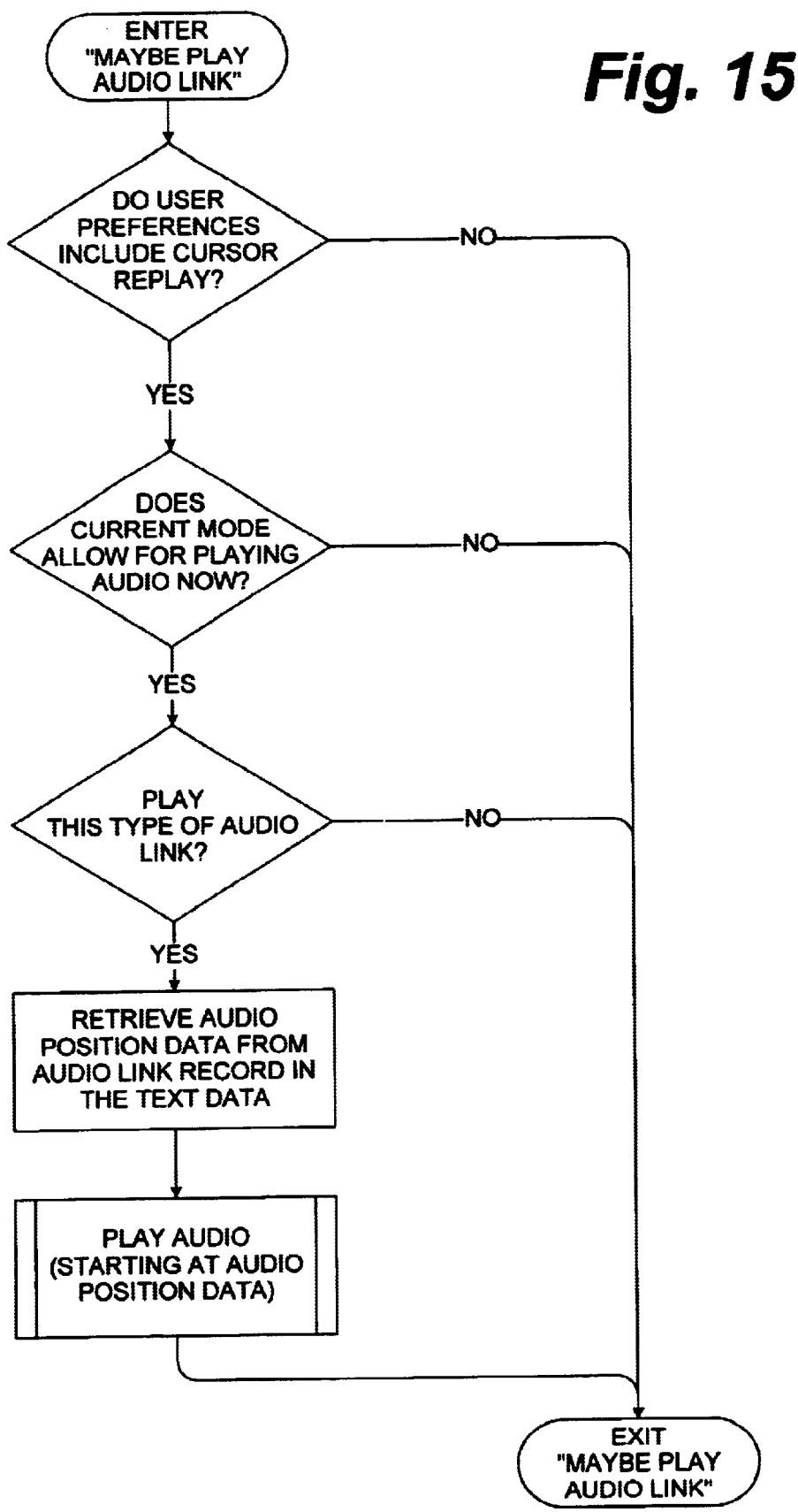

FIG. 15 shows the steps of the "Maybe Play Audio Link" subroutine. The first step tests whether or not the active user preference set provides for replay on mere caret or cursor movements. The next test makes sure it is okay to play anything according to the current mode. For example, if the current mode involves recording into the current window, it is not appropriate to switch to playing. This is because it is preferred that simultaneous (i.e., duplex) recording and playing on the same word processor file be done through separate windows that both have that file open. Then there can be two caret positions, one in each window. The third test decides whether this particular audio link should initiate playback, based on the type of binding event that created the audio link in the first place.

If the pointing device event survives the above tests (administered in any sequence), playback of the corresponding portion of the audio recording should be initiated. This is done by retrieving from the audio link the audio file index number and the position information, and calling the "Play Audio" subroutine.

Figure 16:
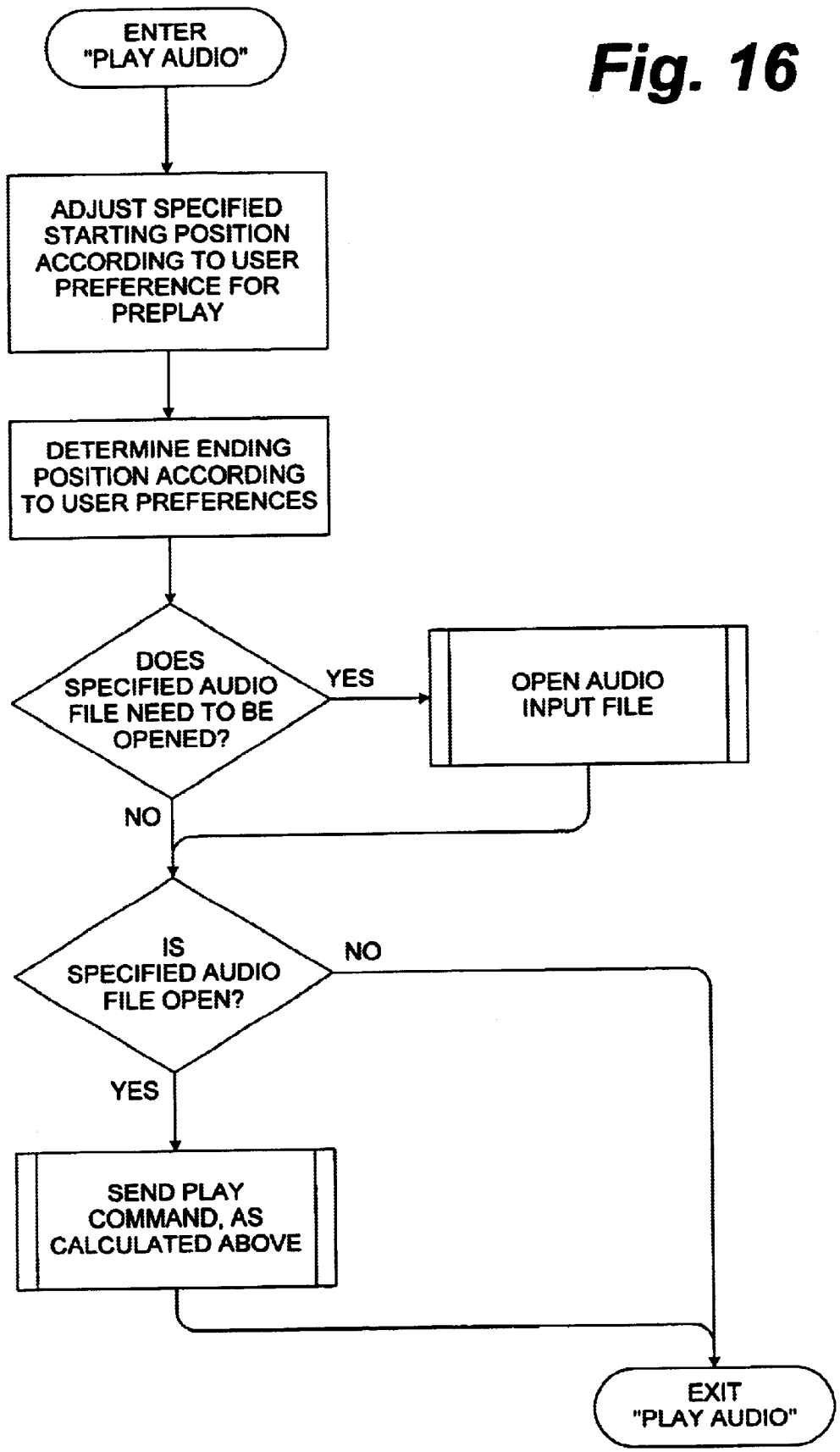

FIG. 16 shows the steps of the "Play Audio" subroutine. The first step adjusts the actual starting position of the audio portion to be replayed.

This is done to compensate for the user's reaction time when the audio link was first established. The user's reaction time is the time that elapsed from the beginning of something important to when the user's response resulted in an audio link. The user will usually want playback to commence from the beginning of the important part, not the audio link. Thus, this reaction time is compensated for by a "preplay" parameter.

This reaction time will vary from user to user and from one audio event to another. Thus, the preplay parameter is another of the user preferences. The preplay parameter is given as a unit of time, such as milliseconds. It is converted to like units if necessary and subtracted from the position information given in the audio link. Of course, the preplay parameter can not cause the recording to start playing before the beginning of the audio data.

Implementation of Stopping Playback

The next step is to determine when play should stop. The active user preference set will specify one of several possible stopping preference. The first stopping preference is for the ending time to depend on one of the next-in-time audio links, which would be treated as an "ending audio link." This "ending audio link" would normally be the next-in-time audio link which is of the same type (or higher) as the one where play is starting. The next-in-time audio link is found by the computer by looking in a list of audio links sorted by their positions in time. Usually, this will also be the next audio link in the text, but not always.

The user preferences should also provide for ways of continuing play a little past the ending audio link, to provide some overlap on the ending side. This overlap can be specified in the user preferences by providing a postplay parameter. This postplay parameter can be positive or negative period of time. It is added to the ending audio link's position in the audio recording.

The user preferences may also provide for using as ending audio link the Nth-next audio link found instead of or in addition to the postplay parameter. Using the Nth-next audio link would be useful where audio links are very close together in time.

The second stopping preference is to continue play until the user stops it manually. Play can be stopped manually by pressing the stop button or specifying another audio link. In the absence of further action from the user, play would continue until the end of the audio recording. If during play back the user specifies another audio link, play would immediate jump the point in the audio recording indicated by the new audio link, as modified by the preplay parameter of the user preferences.

The third stopping preference is to continue play for a predetermined period of time (e.g., three seconds). This stopping preference should be accompanied by a safety feature that warns the user if play did not continue past the next audio link. With this stopping preference, some of the audio recording can not be accessed without changing stopping preferences.

The fourth stopping preference is like a cross between the first and the third. It is that play continues until the later of (1) the Nth-next audio link plus the postplay parameter, as described above, and (2) a predetermined period of time. If the predetermined period of time is very short, such as one to five seconds, this stopping preference is probably the most useful. (The sum of the preplay and postplay parameters can also result in a minimum time, except that this minimum time is added to the elapsed time between two audio links.)

The next step makes sure the correct audio input file is open, according to the audio file index number. If not, it tries to open it. If it can not open it, the play command is not sent to the hardware. (An error message can be displayed, if desired.) If the correct audio file is open, the play command can be sent to the multimedia hardware.

Implementation of Deletion

The final step in the basic use of the invention is to delete the audio recording. This is an optional step, as the user may wish to retain the audio recording (or portions of it) indefinitely, or transfer it to tape before deleting it. However, audio data files can be very large. As previously pointed out, when recording at 11,025 eight-bit samples per second, a one hour lecture requires just over thirty-nine million bytes of hard disk space. Thus, the purpose of this step is to free up the storage space for future uses of the invention and other uses of the computer. The need to erase the audio recording puts some pressure on the user to not procrastinate these final two steps of using and deleting the recording. Often, such pressure is desirable. When the invention is used to delete the audio, the invention also removes the audio links from the text file without deleting the text. Of course, the user could choose to delete both audio and text.

The ability to delete all of the audio recording and all of the audio links in a file is sufficient for the invention. However, sophisticated implementations of the invention may permit the user to selectively delete parts of an audio recording. The user would indicate the part to be deleted by selecting the text that is audio-linked to the part to be deleted and then issuing a delete-audio-only command. The opposite can be done to save a particularly important part of the audio recording. Once a part of the audio recording has been saved, a general (global) delete audio command would not affect the saved portion. Once the invention has been used to indicate which portions of the audio recording are to be saved or deleted, the actual selective saving and deleting of audio may be done in software according to standard audio data file editing techniques.

Selective deletion of an audio file can take a great deal of time when it requires the computer to read and rewrite portions of huge audio file. If selective deletion is to be an important feature of a particular implementation of the invention, as is preferred, the following technique should be used to make it work faster. A user preference is established for limiting the size of an audio file. A typical default limit might be one megabyte. (A megabyte is $2^{20}$ or 1,048,576 bytes.) During recording, whenever an audio file's size reaches the limit, the computer closes this file and creates a new one. As usual, each audio link indicates both the file and the position within the file. After an hour of recording at the abovementioned sample rate, the computer will have created about thirty-eight audio files of about one megabyte each. When the user deletes a portion of the audio, the computer looks at the audio links pointing from the text to the audio to identify which audio files are involved and what portions are not selected and should be retained. Audio files that can be deleted in entirety are deleted without the computer reading and rewriting them. This results in considerable time savings. Usually there will be one or two files that require partial deletion. These files can be rewritten much faster than rewriting all the audio data.

Preferably the computer should make sure that the audio can be deleted safely. It can do this by searching for audio links that are not selected for deletion. If any are found, the user may be warned, or the portion of the audio they point to may be preserved even though it occurs between two audio links that are selected for deletion. The best place to search is in a list of audio links sorted in time sequence. Such a list can be prepared for each audio file and can indicate whether more than one text file has audio links to the same audio file.

Often, as the user cleans up the audio files, several selective deletion command will issued in a short time. Another user preference is whether or not to hold intact the files that require partial deletion until it can be determined whether more audio will be deleted from any of these same files. The object is to consolidate partial deletion commands involving the same file into one pass. When a selective delete command results in the need to rewrite an audio file, the computer should paint a button on the display. The button may be labeled "End of deletions" or "Complete deletions now" or the like. When the user is finished cleaning up, he can press the button and the computer rewrites the appropriate audio files.

The optimal limit for audio file size depends on many things. That is why it can be set by the user. However, it is not critical, and only power users will feel the need to change the default limit. If the audio file size limit is set to zero, this is interpreted as no limit on audio file size and the invention will behave as if it did not have this feature. A non-zero limit is interpreted as a real limit on the size of an audio file. For storage efficiency, all limits whether small or large should preferably be multiples of the file system's minimum allocation unit size (e.g., 8192 bytes in some computers) to prevent leaving unused space at the end of each audio file.

The limit is too small if it results in an excessively large number of audio files. One problem with too many audio files is that the computer may limit the number of files that can be stored in one directory or folder. Another problem is that deletion of all or much audio will take longer as the computer has to continually update directory (folder) information.

A limit can be zoo large too. The problem of a large limit shows up when the user selectively delete many small portions of the audio. These small portions may be arranged in a way that touches many large audio files, causing many large files to be rewritten. Optionally, the computer can monitor these issues and suggest changes or even implement changes transparently.

Figure 17:
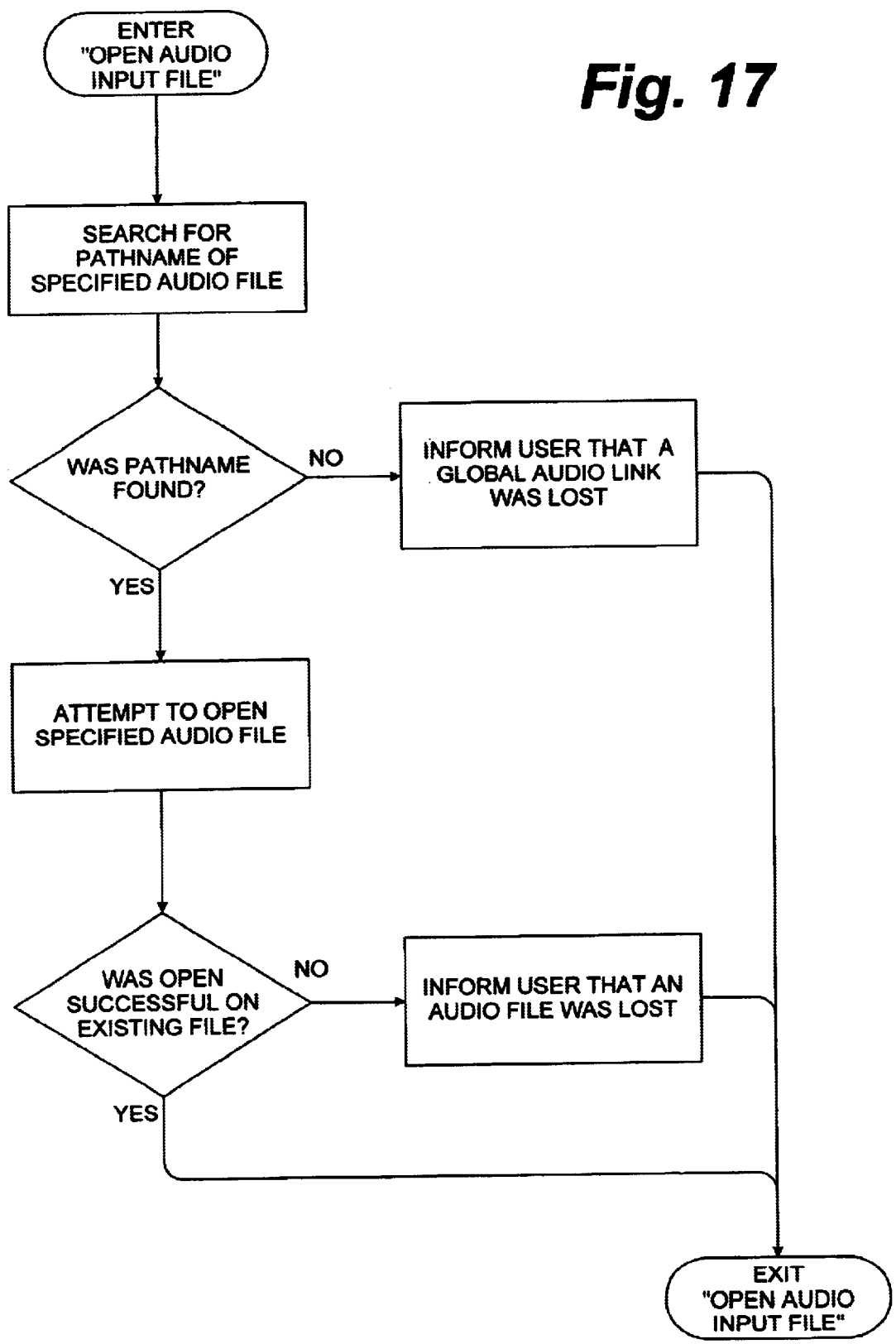

FIG. 17 shows the details of the "Open Audio Input File" procedure. This is called before playing an audio file that is not yet open. Its implementation is very straightforward, and it does show one way of handling some error conditions.

Figure 18:
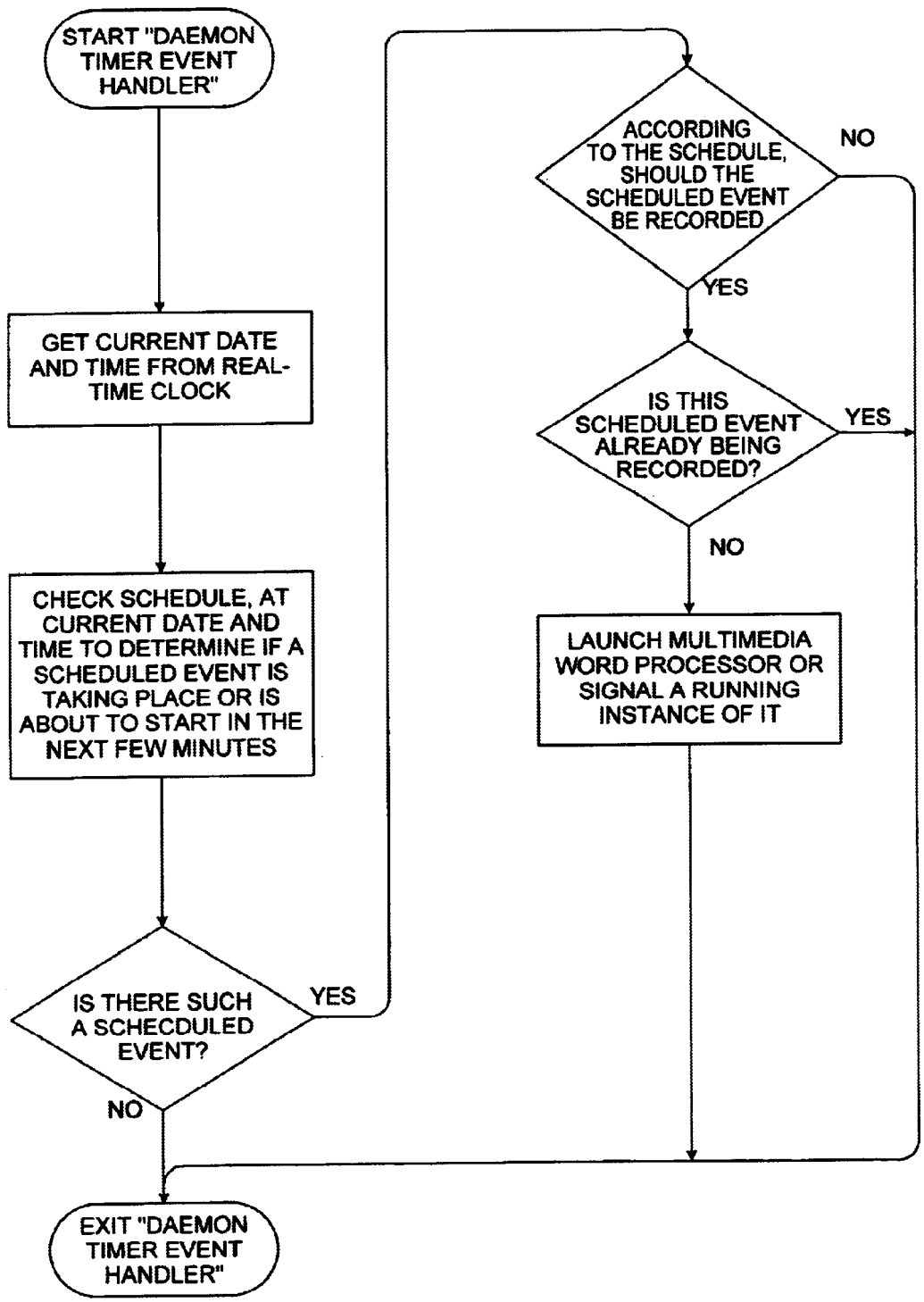

FIG. 18 shows another program that may run concurrently with the multimedia word processor. This is a daemon, a program that is started every time the computer system is booted up, and that usually always runs in the background. It's purpose is to launch the multimedia word processor for scheduled events. It is an optional feature of the invention that the user can turn off by preventing the daemon's launch upon system boot.

Another function useful for the invention is to provide a button or key that will play audio while it is pressed and will stop play when it is unpressed, or shortly thereafter. This could be a keyboard key (such as a function key), a mouse button (such as the middle mouse button available on some computers), a button having its own input path into the computer (such as the game port on IBM PC compatible computers), or anything else that can perform this function. The lockstep key can perform this function simply by starting play when the lockstep key is pressed and not setting the ending time until the key is released. Play would continue after the key is released until the segment play length 224 has expired. Using the lockstep key in this dual manner is preferred as the default configuration to keep the invention simple to use. Nevertheless, the user should have the option of assigning a play-only-while-pressed function to another key of the user's choice. This can be an option on the lockstep page of the tabbed notebook component 120 of the Edit Configurations dialog box 100, something as follows: "Assign play-onlywhile-pressed function to |_____|", with the box being a selection box similar to 222.

Another function useful for the invention is to provide a button or key that will mark a portion of audio important such that it should not be deleted when the rest of the audio is deleted. This function is to be provided in addition to the save audio function described above, and it is very similar. This new function, for now called the "Audio Transcription" function, would be useful in saving portions of audio delimited by very accurate begin and end times. Because of human reaction times and computer latency, presave and postsave times should be provided and should be user-settable. These presave and postsave times correspond in meaning to the preplay and postplay times described above.

The purpose of the "Audio Transcription" function is help the user save manual transcription time. The user may not always have the time to transcribe everything that is important by manually typing it in. In those times the listener may use the Audio Transcription button or key to mark the beginning and ending points that the user would transcribe if time were available. Usually the user would do this after the audio event, but the invention allows this to be done during the audio event also. When done after the audio event, the user may use notes and audio links generated during the event to find the right portions of the audio recording. Then, the exact begin and end times may be marked at a higher playback rate.

In the text edit area 62, the availability of each "Audio Transcription" is advertising by an icon. Clicking on the icon plays the "Audio Transcription" at the then current replay rate. A progress bar may appear outside of the text edit area to indicated the length of the "Audio Transcription" and to track the percentage played.

The foregoing description of the preferred embodiments of the invention includes many features that are to be provided optionally. The best mode of the invention includes the optional features. Nevertheless, the basic invention without any of the optional features is still very useful. Some optionally provided features may increase the cost, complexity, amount of documentation and support requirement more than some potential users are willing to pay for and deal with. Thus, as is commonly done with products, several versions of the invention should be offered to potential customers, representing a range of complexity from an economical version providing only basic utility up to more expensive and sophisticated versions that include most to all of the optionally provided features.

The foregoing description of the preferred embodiments of the invention has been presented for the purposes of illustration and description. Many modifications and variations thereof will present themselves to those skilled in the art without departure from the scope and spirit of the invention. Therefore, the invention is not limited to the embodiments and examples shown, but only to the limitations defined in the appended claims.

I claim:

1. A method of taking notes while listening to an audio event and thereafter improving these notes, using a computing device having a memory, a display and at least when needed a microphone and at least when needed an audio output device, said method comprising the steps of:

(a) said computing device making a recording of an audio event as it happens by recording the sounds picked up by said microphone and storing them in said memory as a digital audio recording;

(b) during said making a recording, said computing device inputting a plurality of user notes and storing said user notes in said memory, each user note comprising at least one of the set of (1) keystrokes, (2) pen strokes converted to characters, and (3) pen strokes stored as sketches;

(c) during said making a recording and said inputting a plurality of user notes, said computing device establishing a plurality of audio links in said memory, each audio link linking a user note that was input and the point in said digital audio recording that was substantially the point being recorded as latter-said user note was being input;

(d) said computing device terminating said step of making a recording;

(e) said computing device providing random access to said user notes and said audio links by said computing device inputting navigation commands to selectively display any portion of said user notes on said display;

(f) after said terminating, said computing device receiving at least one play command, each said play command selecting at least one of said audio links;

(g) said computing device obtaining a starting point from an audio link by subtracting a predetermined substantial preplay time from said audio link's point in said digital audio recording;

(h) responsive to said play command, said computing device playing back said digital audio recording to said audio output device starting from the starting point indicated by the audio link that was selected by said play command;

(i) after receiving at least one said play command, said computing device inputting editing commands for editing said user notes proximate to the audio link that was selected by latter-said play command;

(j) during said computing device playing back said digital audio recording, said computing device increasing the speed of playback to a preconfigured amount substantially faster than normal speed of playback.

2. The method of claim 1 additionally comprising the step of said computing device correcting the pitch of playback by an amount sufficient to compensate for said increasing speed of playback.

3. The method of claim 1 wherein said preconfigured amount is in the range of 125% to 200%, inclusive, of normal speed of playback.

4. The method of claim 1 wherein said computing device includes a silent mode and said method additionally comprises the steps of:

at the commencement of said making a recording, said computing device entering said silent mode, said silent mode persisting past the termination of said step of making a recording;

responsive to said play command, said computing device first checking whether said computing device is in said silent mode and if said computing device is in said silent mode then said computing device refusing to play back the recording and if said computing device is not in said silent mode then said computing device proceeding to play back the recording;

said computing device inputting permission to break the silence and responsive to said permission, said computing device leaving said silent mode.

5. The method of claim 1 additionally comprising the steps of during said computing device playing back said digital audio recording and during said computing device inputting editing command for editing said user notes, said computing device inputting additional user notes and establishing additional audio links to link said additional user notes with said digital audio recording, each additional audio link linking a user note that was input with the point in said digital audio recording that was substantially the point being played back as latter-said user note was being input.

6. The method of claim 1 additionally comprising the steps of after said step of said computing device inputting editing commands, said computing device inputting an optional command to delete said digital audio recording and responsive to said optional command to delete, said computer deleting said digital audio recording and also deleting all of said audio links that link to a point in said digital audio recording, and retaining said user notes.

7. The method of claim 1 additionally comprising the steps of:

said computing device establishing a timer with a predetermined expiration time, responsive to the inputting of every user note, said computing device restarting said timer, responsive to each expiration of said timer, said computing device inserting a symbol in said user notes and establishing a periodic audio link that links said symbol and the point in said digital audio recording that was being recorded when said timer expired, and said computer restarting said timer;

said computing device inputting commands to hide and show the symbols and responsive to said commands, said computing device hiding or showing the symbols on said display;

whereby a series of one or more symbols in the user notes indicates a period of idleness during which time no user notes were input and said computing device preserves convenient access to said digital audio recording that was recorded during said period of idleness.

8. A method of taking notes while listening to an audio event and thereafter improving these notes, using a computing device having a memory, a display, a real time clock and at least when needed a microphone and at least when needed an audio output device, said method comprising the steps of:

(a) said computing device inputting a schedule of events that are to be recorded and storing said schedule in said memory as a list of scheduled events, said schedule comprising a plurality of groups, each group comprising a plurality of similar events;

(b) said computing device associating a plurality of word processor files with said plurality of groups, such that each word processor file is associated with one of said groups;

(c) said computing device checking its real time clock and said list of scheduled events to determine whether one of the scheduled events is happening, and if so, said computing device automatically recording this scheduled event and said computing device opening the word processor file that is associated with the group of which said scheduled event is a member;

(d) said computing device making a recording of said scheduled event as it happens by recording the sounds picked up by said microphone and storing them in said memory as a digital audio recording;

(e) during said making a recording, said computing device inputting a plurality of user notes and storing said user notes in said word processor file that was opened, each user note comprising at least one of the set of (1) keystrokes, (2) pen strokes converted to characters, (3) pen strokes stored as sketches, and (4) pressing a button provided for establishing a timestamp;

(f) during said making a recording and said inputting a plurality of user notes, said computing device establishing a plurality of audio links, each audio link linking a user note that was input and the point in said digital audio recording that was substantially the point being recorded as latter-said user note was being input;

(g) said computing device terminating said step of making a recording;

(h) said computing device providing random access to said user notes and said audio links by said computing device inputting navigation commands to selectively display any portion of said user notes on said display;

(i) after said terminating, said computing device receiving at least one play command, each said play command selecting at least one of said audio links;

(j) said computing device obtaining a starting point from an audio link by subtracting a predetermined substantial preplay time from said audio link's point in said digital audio recording;

(k) responsive to said play command, said computing device playing back said digital audio recording to said audio output device starting from the starting point indicated by the audio link that was selected by said play command;

(l) after receiving at least one said play command, said computing device inputting editing commands for editing said user notes proximate to the audio link that was selected by latter-said play command.

9. The method of claim 8 additionally comprising the step of, when said computer device checks its real time clock, initiating recording starting a few minutes prior to the beginning of a scheduled event that is about to happen.

10. The method of claim 8 additionally comprising the steps of:

said computing device saving said word processor file as a hypertext markup language format file, wherein at least a plurality of said audio links are represented in said hypertext markup language format file as hyperlinks referencing a plurality of audio files;

said computing device saving at least some of said digital audio recording in said plurality of audio files, wherein each audio file of said plurality of audio files contains a copy of a portion of said digital audio recording, and wherein each audio file starts approximately at a point in said digital audio recording that is linked by at least one link of said plurality of links;

whereby said hypertext markup language format file and said audio files are accessible by hypertext markup language browser software and whereby said hyperlinks each reference an audio file that approximately starts with the portion of said digital audio recording that was pointed to in the audio link from which said hyperlink arose.

11. The method of claim 8 additionally comprising the steps of:

said computing device saving said word processor file as an enhanced hypertext markup language format file, wherein at least a plurality of said links are represented in said enhanced hypertext markup language format file as hyperlinks referencing at least one audio file and wherein each said hyperlink further references a point within said at least one audio file, each reference substantially corresponding in data content to the audio link from which said reference arose;

said computing device saving at least some of said digital audio recording in said at least one audio file;

whereby said hypertext markup language format file and said at least one multimedia file are accessible by hypertext markup language browser software that is enhanced with the capability of referencing and playing an audio file starting at any specified point within the referenced audio file.

12. A method of both taking and improving notes while listening to an audio event, using a computing device having a memory, a display capable of displaying a plurality of windows, and at least when needed a microphone and at least when needed an audio output device, said method comprising the steps of:

(a) said computing device making a recording of an audio event as it happens by recording the sounds picked up by said microphone and storing them in-said memory as a digital audio recording;

(b) during said making a recording, said computing device inputting a plurality of user notes and storing said user notes in said memory and displaying said user notes in a first window, each user note comprising at least one of the set of (1) keystrokes, (2) pen strokes converted to characters, and (3) pen strokes stored as sketches;

(c) during said making a recording and said inputting a plurality of user notes, said computing device establishing a plurality of audio links in said memory, each audio link linking a user note that was input and the point in said digital audio recording that was substantially the point being recorded as latter-said user note was being input;

(d) said computing device providing random access to said user notes and said audio links by said computing device inputting navigation commands to selectively display any portion of said user notes on said display;

(e) said computing device inputting a command to open a second window and displaying at least a portion of a word processor file, said word processor file including audio links to a digital audio recording in said computing device's memory;

(f) said computing device inputting selective play commands in said second window, said selective play commands selecting at least a particular point in the word processor file in said second window that is proximate to an audio link;

(g) said computing device, responsive to said selective play commands, following said link to a particular point in the digital audio recording and initiating playback to an earphone starting approximately from said particular point in the digital audio recording;

(h) said computing device recording audio to the portion of the word processor file displayed in said first window and simultaneously playing audio using the portion of the word processor file displayed in said second window;

(i) said first window, responsive to user input to said first window, establishing audio links according to predetermined rules;

whereby a user can divide his or her attention between taking notes of an event in real time in said first window and reviewing said multimedia data and improving notes in said second window without any risk of missing something important in the real time event.

13. A method of taking notes while listening to an audio event and thereafter improving these notes, using a computing device having a memory, a display and at least when needed a microphone and an audio output device, said method comprising the steps of:

(a) said computing device making a recording of an audio event as it happens by recording the sounds picked up by said microphone and storing them in said memory as a digital audio recording;

(b) during said making a recording, said computing device inputting a plurality of user notes, each user note comprising at least one of the set of (1) keystrokes, (2) pen strokes converted to characters, and (3) pen strokes stored as sketches;

(c) during said making a recording and said inputting a plurality of user notes, said computing device establishing a plurality of audio links, each audio link linking a user note that was input and the point in said digital audio recording that was substantially the point being recorded as latter-said user note was being input;

(d) said computing device terminating said step of making a recording;

(e) providing random access to said user notes and said audio links by said computing device inputting navigation commands to selectively display any portion of said user notes on said display at any time;

(f) after said terminating, said computing device receiving at least one lockstep play-next-segment command;

(g) responsive to each said lockstep play-next-segment command, said computing device playing back a segment of said digital audio recording to said audio output device for a predetermined segment play length time and then stopping play back, said predetermined segment play length time being sufficiently long for there to be some audio to transcribe and sufficiently short to act on it completely with only one listening;

(h) responsive to successive lockstep play-next-segment commands, said computing device slightly overlapping the segments of the digital audio recording played back by a predetermined segment overlap time, said predetermined segment overlap time being substantially shorter than said predetermined segment play length time;

(i) after receiving at least one lockstep play-next-segment command, said computing device inputting editing commands for editing said user notes.

14. The method of claim 13 wherein said predetermined segment play length time is about 3.5 seconds and said predetermined segment overlap time is about 0.7 seconds.

15. The method of claim 13 wherein said step of inputting editing commands additionally comprises the steps of:

after a lockstep play-next-segment command, said computing device inputing additional user, said additional user notes comprising a plurality of ink-printing characters;

responsive to the first ink-printing character input after said lockstep play-next-segment command, said computing device establishing a lockstep audio link in said memory, said lockstep audio link linking said ink-printing character and the point in said digital audio recording that was at the beginning of the segment of said digital audio recording that was last played;

after said establishing a lockstep audio link, said computer inputting a play command that selects said lockstep audio link and responsive to said play command, said computing device playing said digital audio recording starting substantially from the point in said digital audio recording pointed to by said lockstep audio link;

whereby the lockstep audio links tightly define a correspondence between the user notes and points in the digital audio recording.

16. A computer-readable memory storage medium comprising a substrate from which a computer can read program codes and data, said computer having a display and at least when needed a microphone and at least when needed an audio output device, said substrate containing a computer program comprising:

(a) means for directing said computer to make a recording of an audio event as it happens by recording the sounds picked up by said microphone and storing them in said computer's memory as a digital audio recording;

(b) means for directing said computer, during said making a recording, to input a plurality of user notes and to store said user notes in said computer's memory, each user note comprising at least one of the set of (1) keystrokes, (2) pen strokes converted to characters, and (3) pen strokes stored as sketches;

(c) means for directing said computer, during said making a recording and said inputting a plurality of user notes, to establish a plurality of audio links in said memory, each audio link linking a user note that was input and the point in said digital audio recording that was substantially the point recorded as latter-said user note was input;

(d) means for directing said computer to device terminate said step of making a recording;

(e) means for directing said computer to provide random access to said user notes and said audio links by directing said computer to input-navigation commands to selectively display any portion of said user notes on said display;

(f) means for directing said computer, to receive at least one play command after said terminating, each said play command selecting at least one of said audio links;

(g) means for directing said computer to obtain a starting point from an audio link by subtracting a predetermined substantial preplay time from said audio link's point in said digital audio recording;

(h) means for directing said computer to respond to said play command by said computer playing back said digital audio recording to said audio output device starting from the starting point indicated by the audio link that was selected by said play command;

(i) means for directing said computer, after receiving at least one said play command, to input editing commands for editing said user notes proximate to the audio link that was selected by latter-said play command;

(j) means for directing said computer, during said computer playing back said digital audio recording, to increase the speed of playback by a preconfigured amount substantially faster than normal speed of playback.

\* \* \* \* \*